US00RE49584E

(19) United States
(12) Reissued Patent
Coenegracht

(10) Patent Number: US RE49,584 E
(45) **Date of Reissued Patent: *Jul. 18, 2023**

(54) TELECOMMUNICATIONS CONNECTION SYSTEM

(71) Applicant: CommScope Connectivity Belgium BVBA, Kessel-Lo (BE)

(72) Inventor: Philippe Coenegracht, Hasselt (BE)

(73) Assignee: CommScope Connectivity Belgium BVBA, Kessel-Lo (BE)

( * ) Notice: This patent is subject to a terminal disclaimer.

(21) Appl. No.: 17/003,597

(22) Filed: Aug. 26, 2020

Related U.S. Patent Documents

Reissue of:
(64) Patent No.: 10,061,090
Issued: Aug. 28, 2018
Appl. No.: 15/300,147
PCT Filed: Mar. 27, 2015
PCT No.: PCT/EP2015/056720
§ 371 (c)(1),
(2) Date: Sep. 28, 2016
PCT Pub. No.: WO2015/144883
PCT Pub. Date: Oct. 1, 2015

U.S. Applications:
(60) Provisional application No. 61/971,739, filed on Mar. 28, 2014.

(51) Int. Cl.
*G02B 6/38* (2006.01)

(52) U.S. Cl.
CPC ..... *G02B 6/3817* (2013.01); *G02B 6/389* (2013.01); *G02B 6/3825* (2013.01); *G02B 6/3826* (2013.01); *G02B 6/3831* (2013.01); *G02B 6/3878* (2013.01); *G02B 6/3887* (2013.01)

(58) Field of Classification Search
CPC .. G02B 6/3817; G02B 6/3825; G02B 6/3826; G02B 6/3831; G02B 6/3878; G02B 6/3887; G02B 6/389
See application file for complete search history.

(56) References Cited

U.S. PATENT DOCUMENTS 4,846,719 A * 7/1989 Iwashita ..... H01R 24/58 439/63
4,896,939 A * 1/1990 O'Brien ..... G02B 6/3816 174/110 R (Continued)

FOREIGN PATENT DOCUMENTS

EP 1006380 A1 * 6/2000 ..... G02B 6/3817
EP 1006619 A2 * 6/2000 ..... G02B 6/3893

(Continued)

OTHER PUBLICATIONS

English translation of JP-S59075218-A retrieved from JPO's Japan Platform for Patent Information (J-PlatPat) website.*

(Continued)

*Primary Examiner* — Peter C English
(74) *Attorney, Agent, or Firm* — Merchant & Gould P.C.

(57) ABSTRACT

The present disclosure relates to a fiber optic connection system (810) that uses a slide clip to provide robust retention of a fiber optic connector (820) within a mating fiber optic adapter (836). In certain examples, the fiber optic connector may be a hybrid connector that provides both electrical and optical connectivity.

17 Claims, 23 Drawing Sheets

(56) References Cited

U.S. PATENT DOCUMENTS

| | | | | |
|---|---|---|---|---|
| 5,134,679 | A * | 7/1992 | Robin | G02B 6/3878 385/79 |
| 8,480,312 | B2 | 7/2013 | Smith et al. | |
| 2001/0046354 | A1 | 11/2001 | Nguyen et al. | |
| 2005/0058402 | A1 | 3/2005 | Ernst et al. | |
| 2006/0093277 | A1 | 5/2006 | Mulligan | G02B 6/3885 385/75 |
| 2006/0153503 | A1 | 7/2006 | Suzuki et al. | |
| 2006/0269194 | A1* | 11/2006 | Luther et al. | G02B 6/3851 385/78 |
| 2008/0089650 | A1 | 4/2008 | Legler et al. | |
| 2009/0148106 | A1* | 6/2009 | Moore et al. | G02B 6/4281 385/89 |
| 2009/0175580 | A1* | 7/2009 | Chen et al. | G02B 6/3817 385/75 |
| 2009/0220200 | A1* | 9/2009 | Wong et al. | G02B 6/4292 385/89 |
| 2010/0061681 | A1* | 3/2010 | Powell | G02B 6/3893 385/56 |
| 2011/0243508 | A1* | 10/2011 | Koreeda et al. | G02B 6/3817 385/78 |
| 2011/0293223 | A1* | 12/2011 | Shimazu et al. | H01R 4/18 385/81 |
| 2015/0219857 | A1* | 8/2015 | Lichoulas et al. | G02B 6/3887 385/60 |

FOREIGN PATENT DOCUMENTS

| | | | | |
|---|---|---|---|---|
| EP | 1337883 | B1 * | 9/2004 | G02B 6/3878 |
| EP | 2 381 282 | A1 | 10/2011 | |
| GB | 2344469 | A * | 6/2000 | G02B 6/3817 |
| JP | 59075218 | A * | 4/1984 | G02B 6/3878 |
| JP | 2005-099345 | A | 4/2005 | |
| JP | 2006-284897 | A | 10/2006 | |
| JP | 2010-156831 | A | 7/2010 | |
| WO | WO2015/120365 | A1 | 8/2015 | |

OTHER PUBLICATIONS

International Search Report and Written Opinion of the International Searching Authority for International Patent Application No. PCT/EP2015/056720 dated Jun. 16, 2015, 15 pgs.

* cited by examiner

FIG. 1
Amended
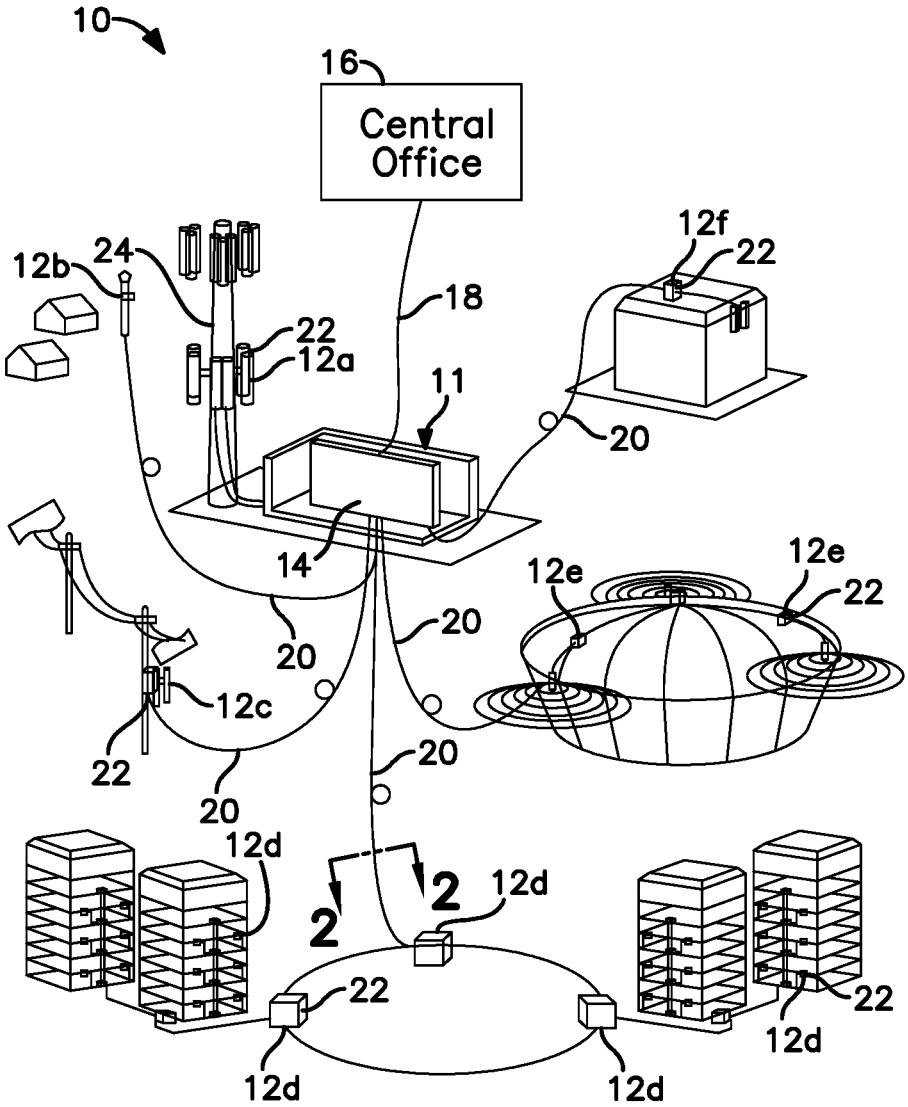

FIG. 2
Amended
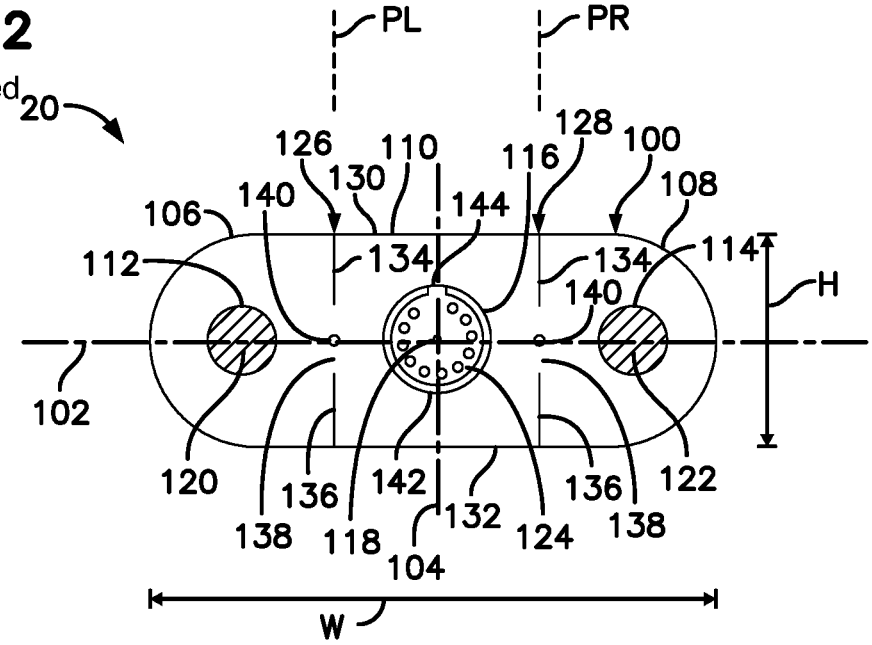

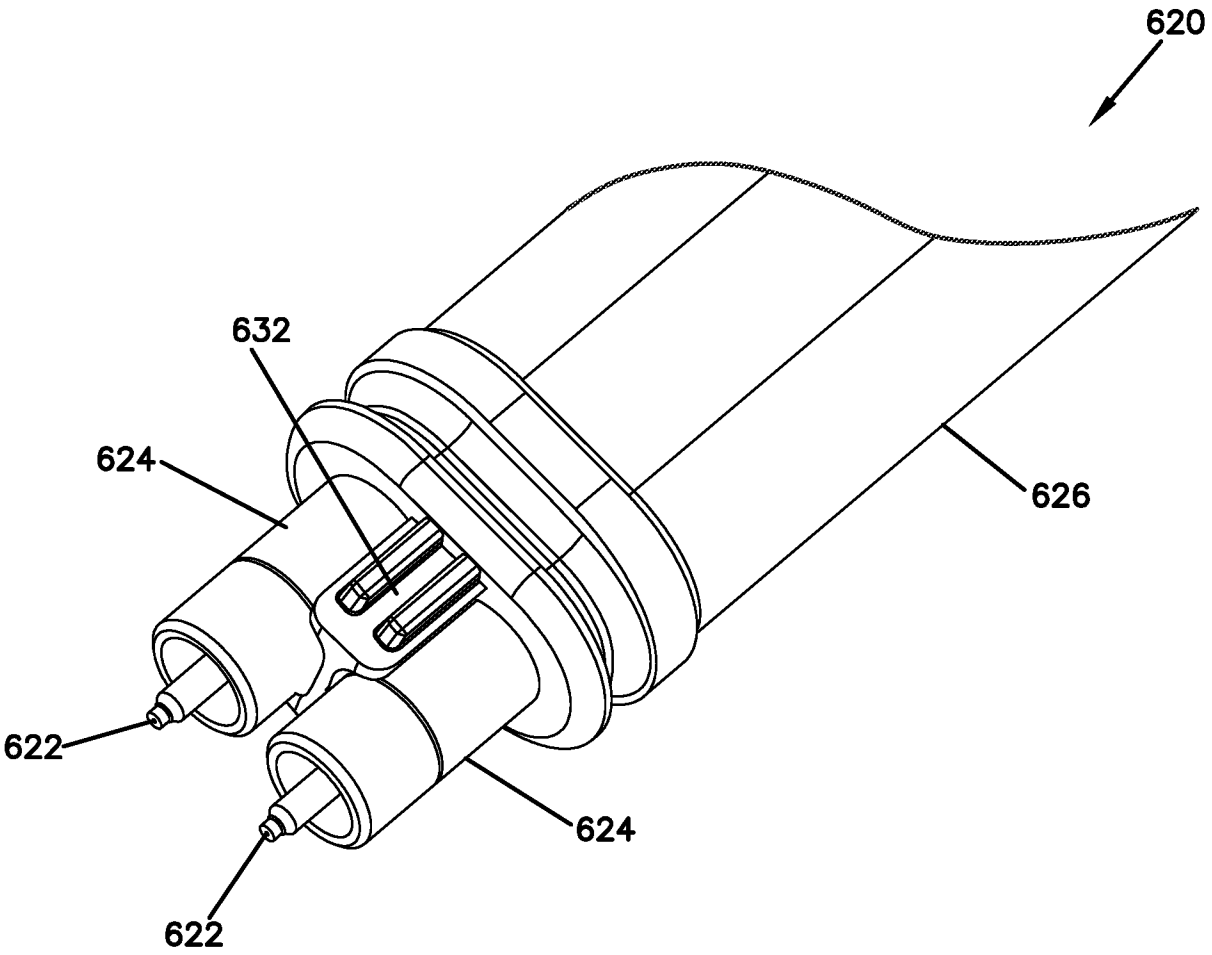
FIG. 6
Amended

FIG. 7
Amended
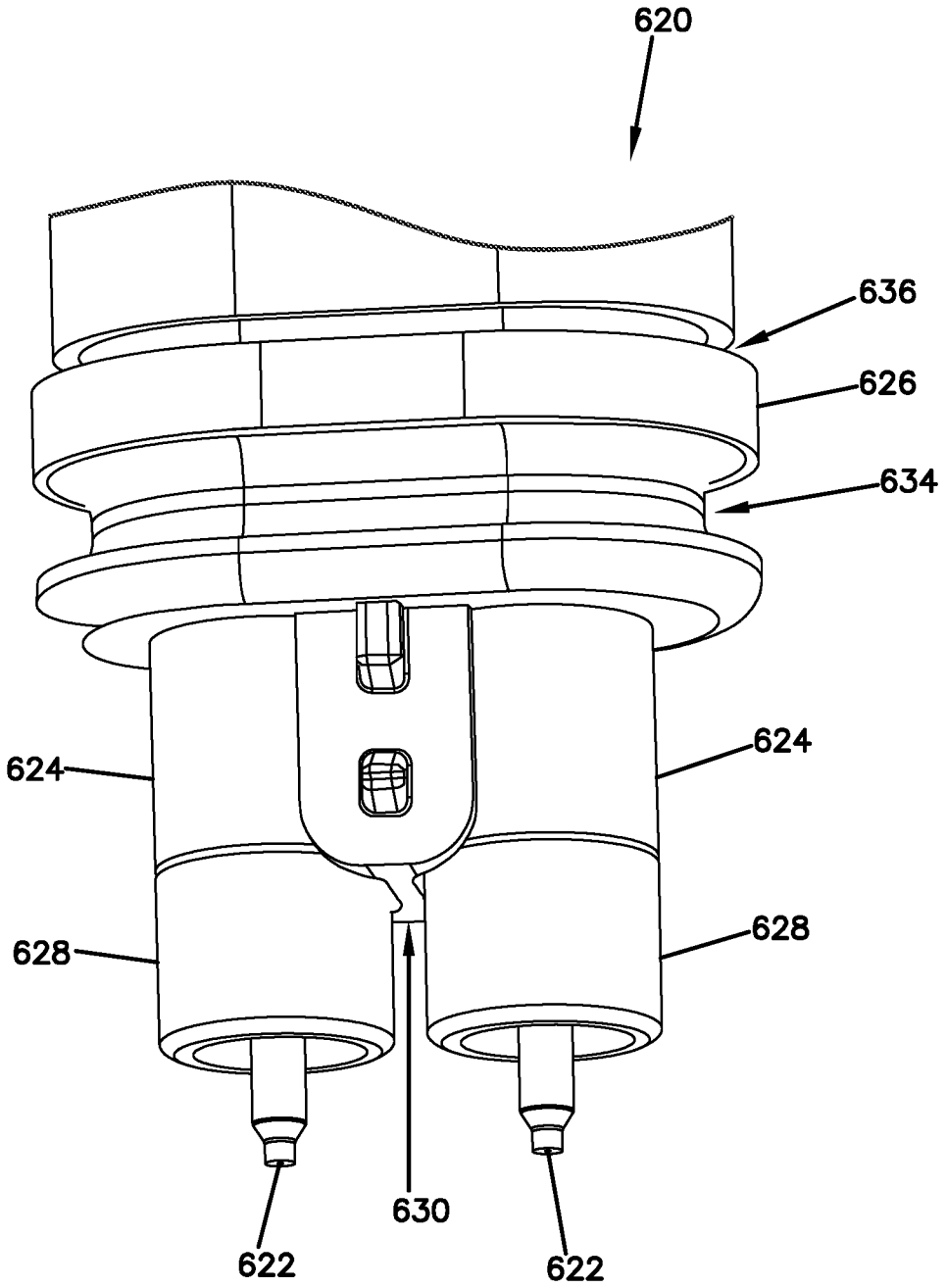

FIG. 8
Amended
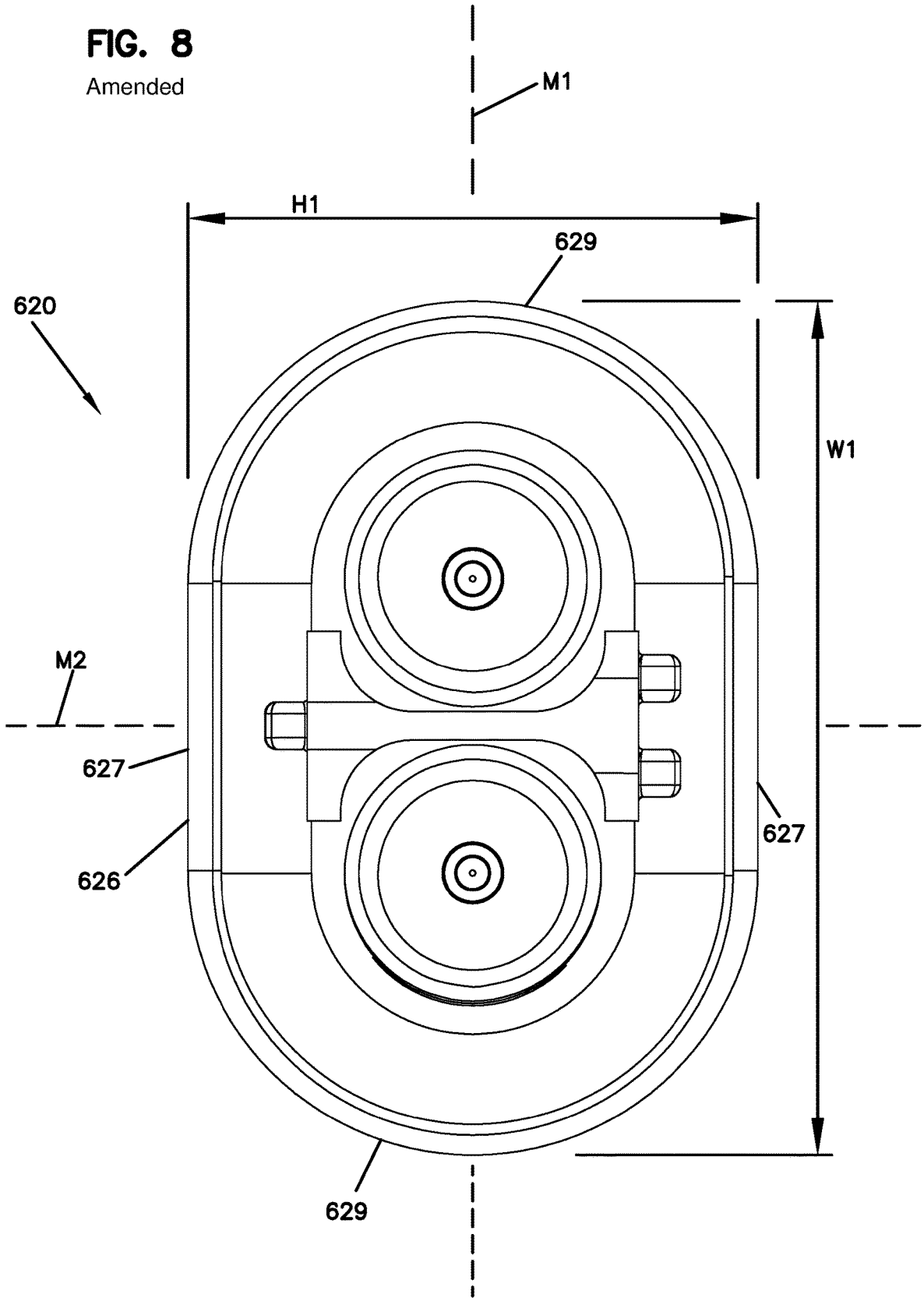

FIG. 9
Amended
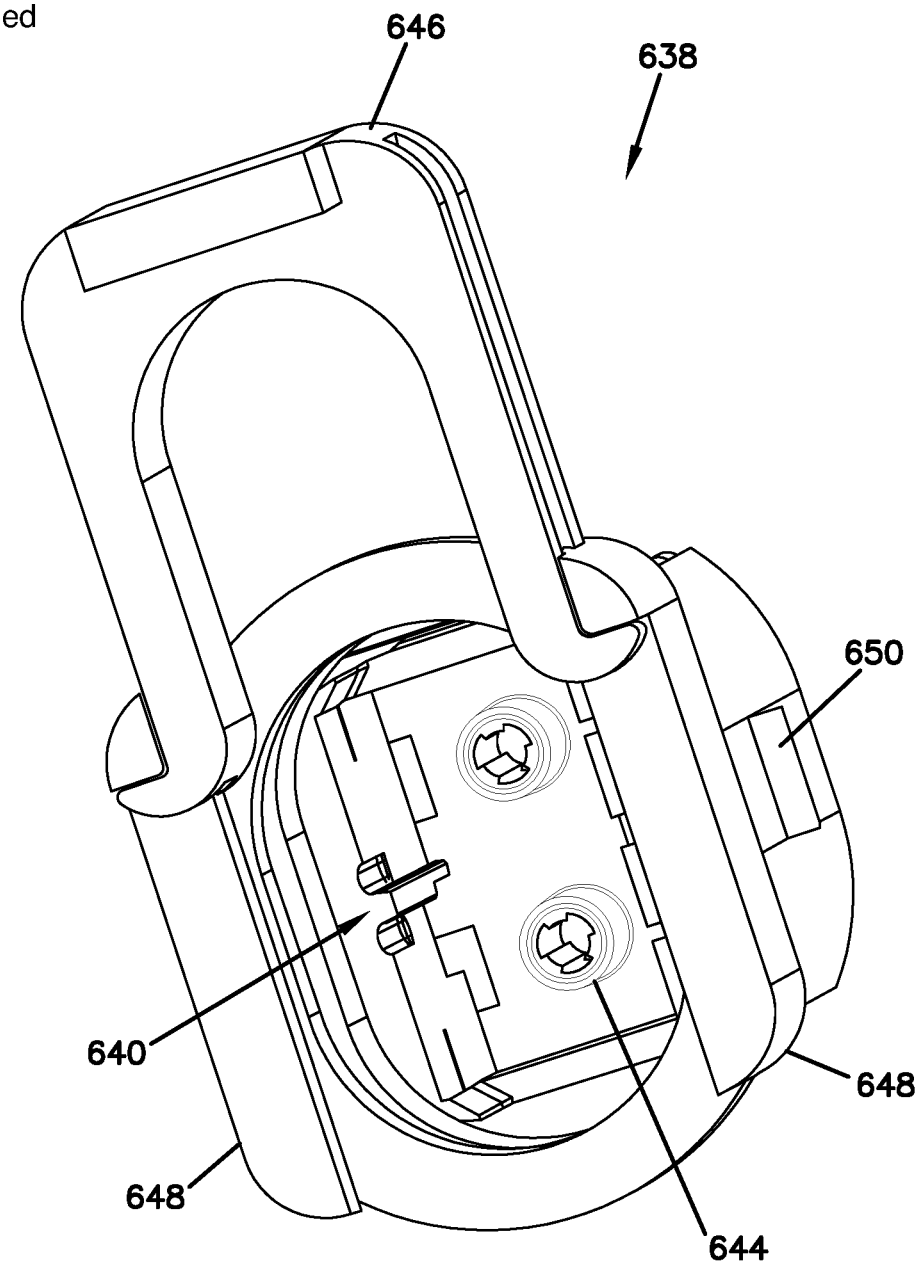

FIG. 10
Amended
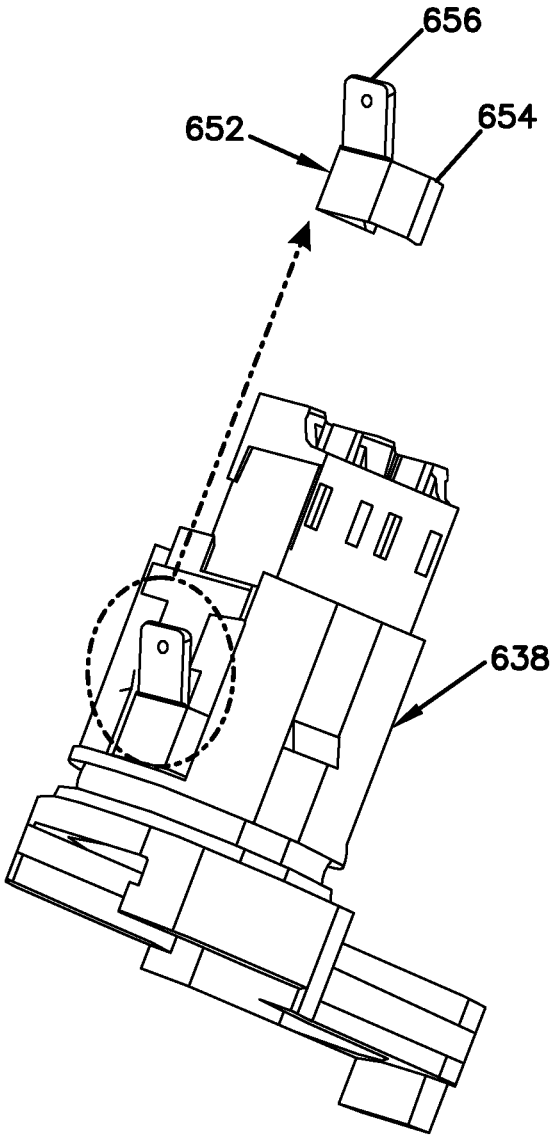

FIG. 11
Amended
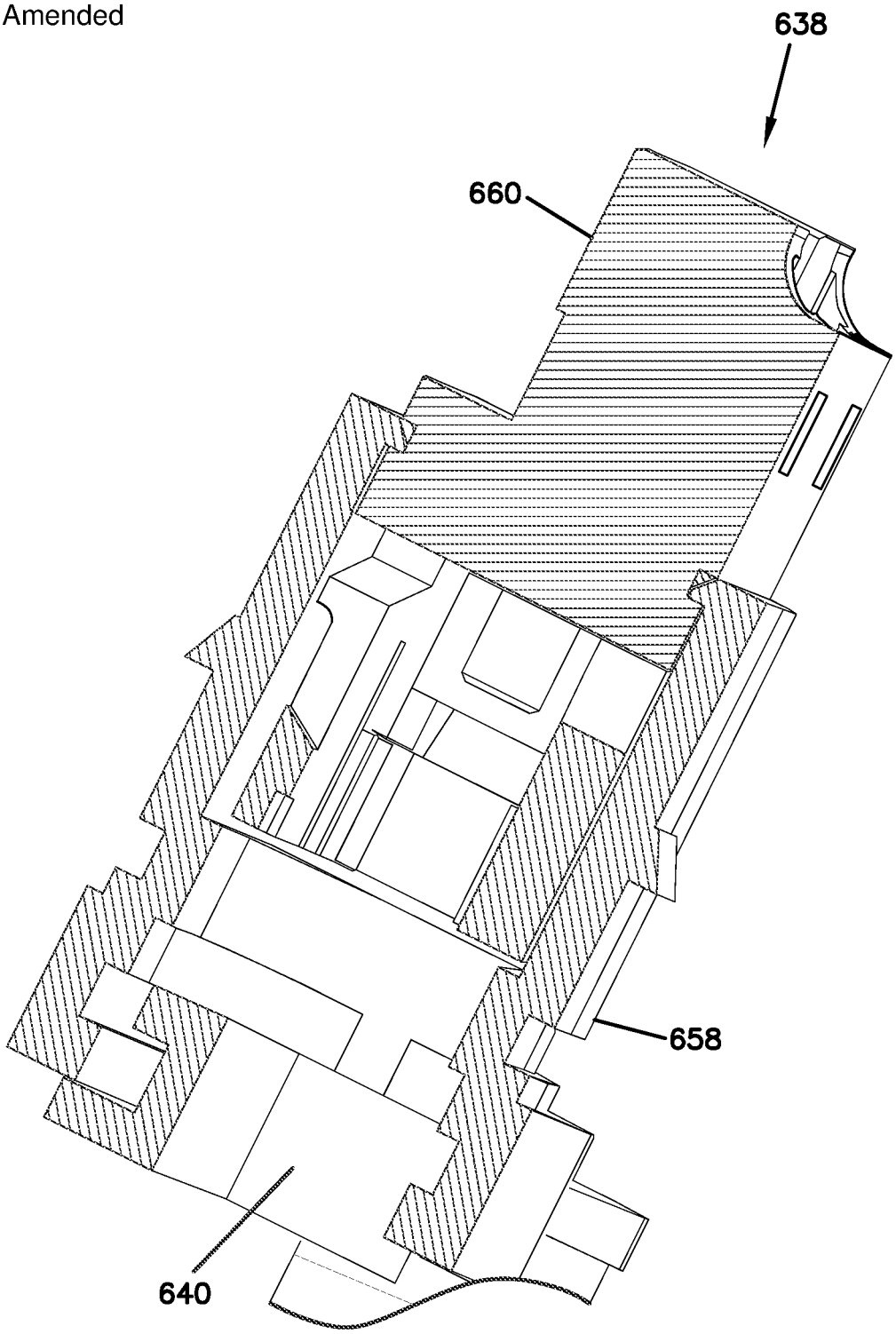

FIG. 12
Amended
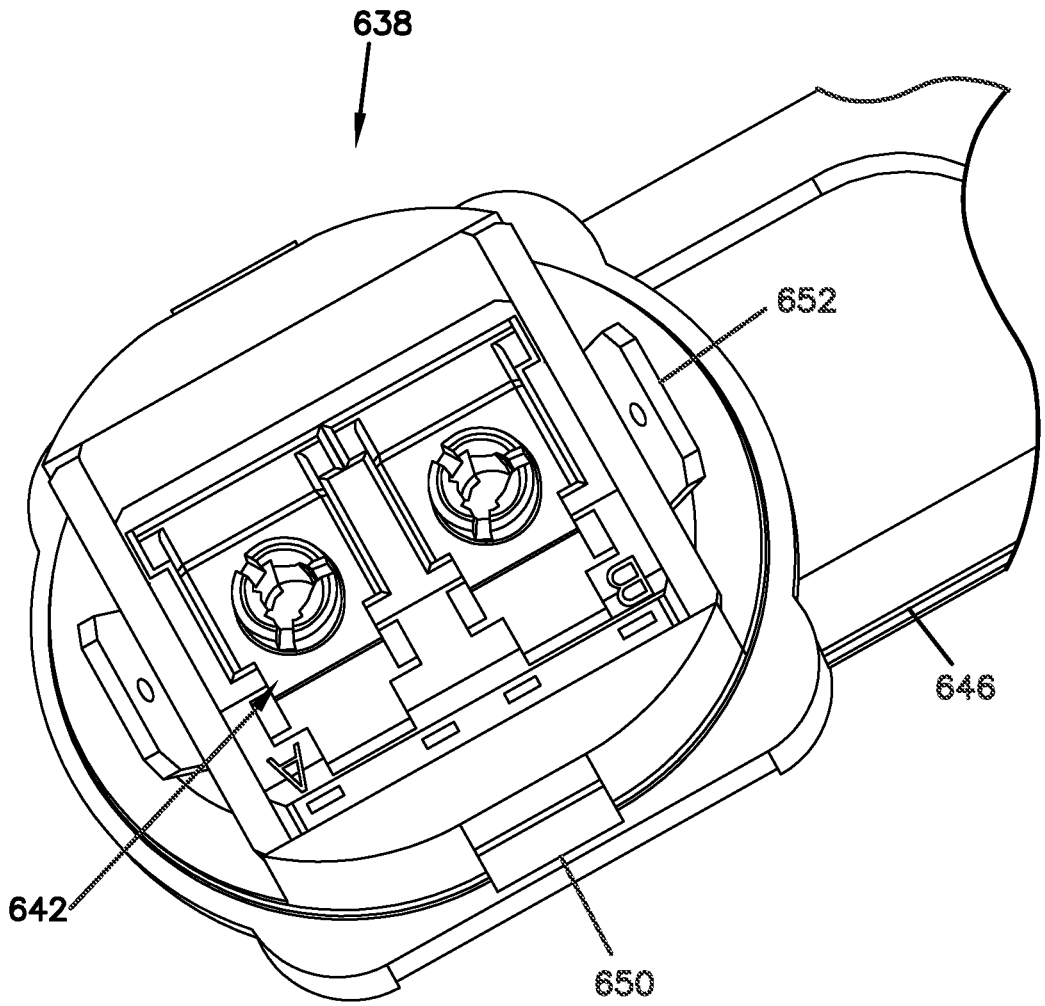

Canceled

Canceled

Canceled

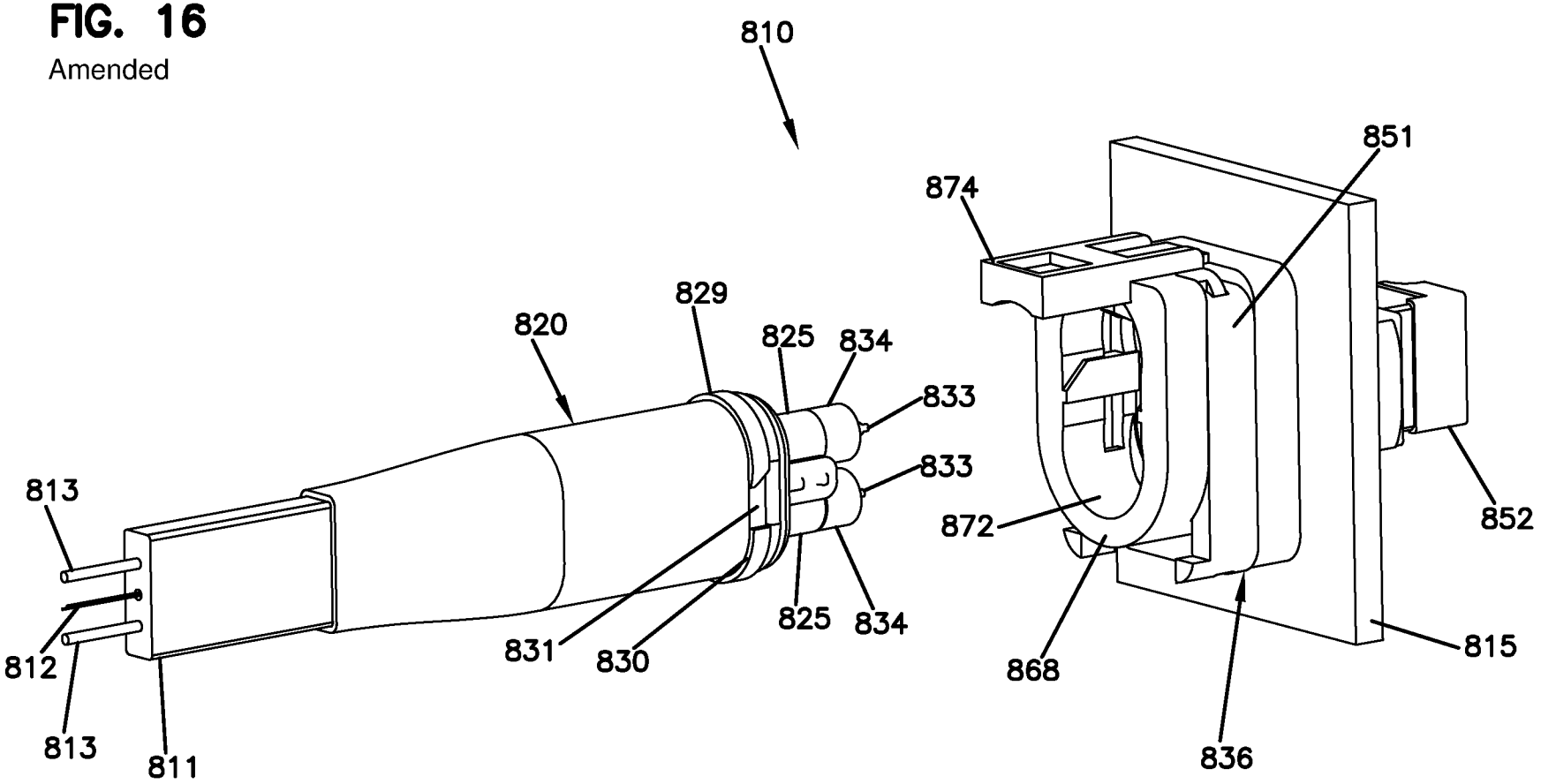
FIG. 16
Amended

FIG. 18
Amended
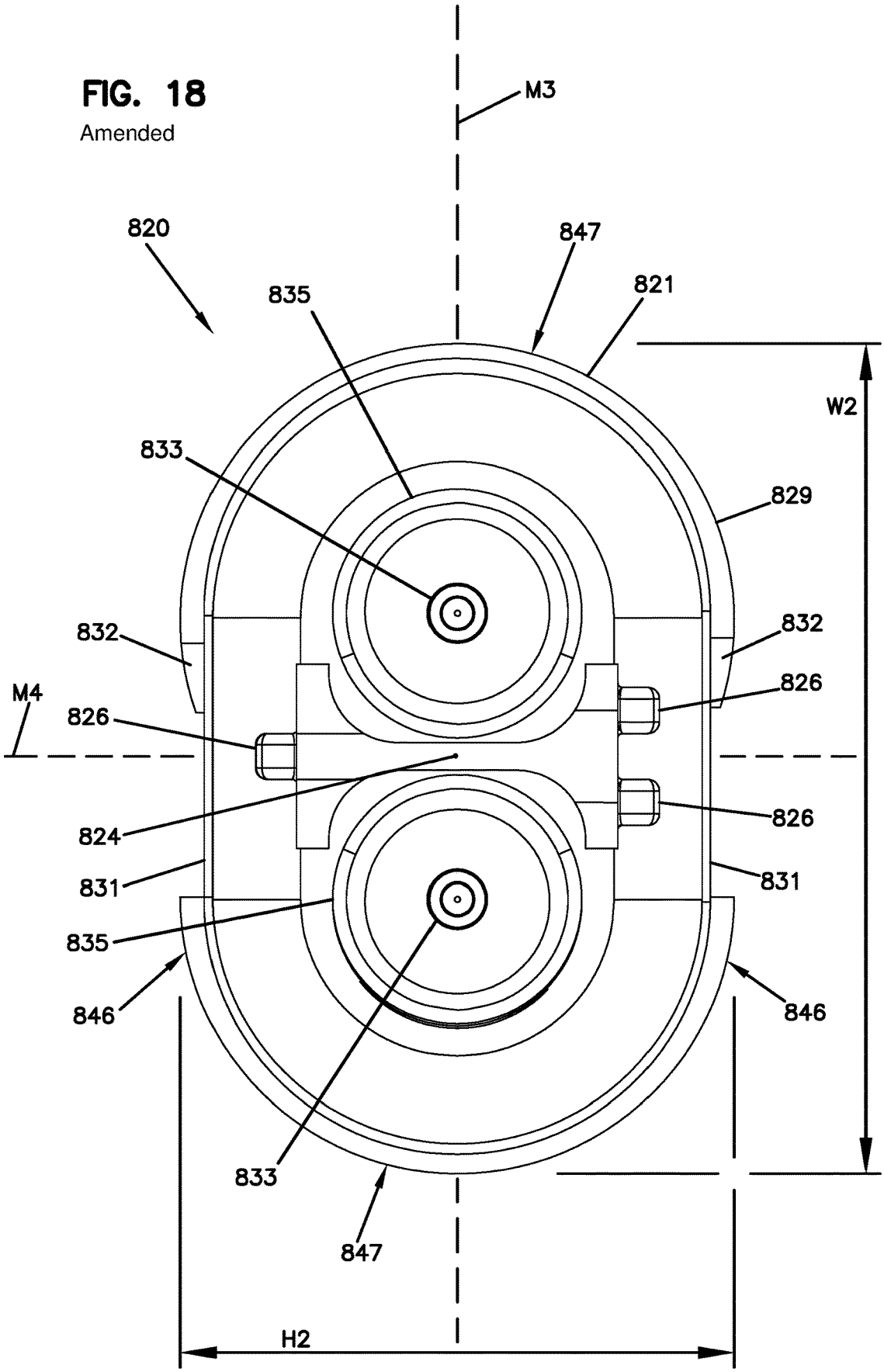

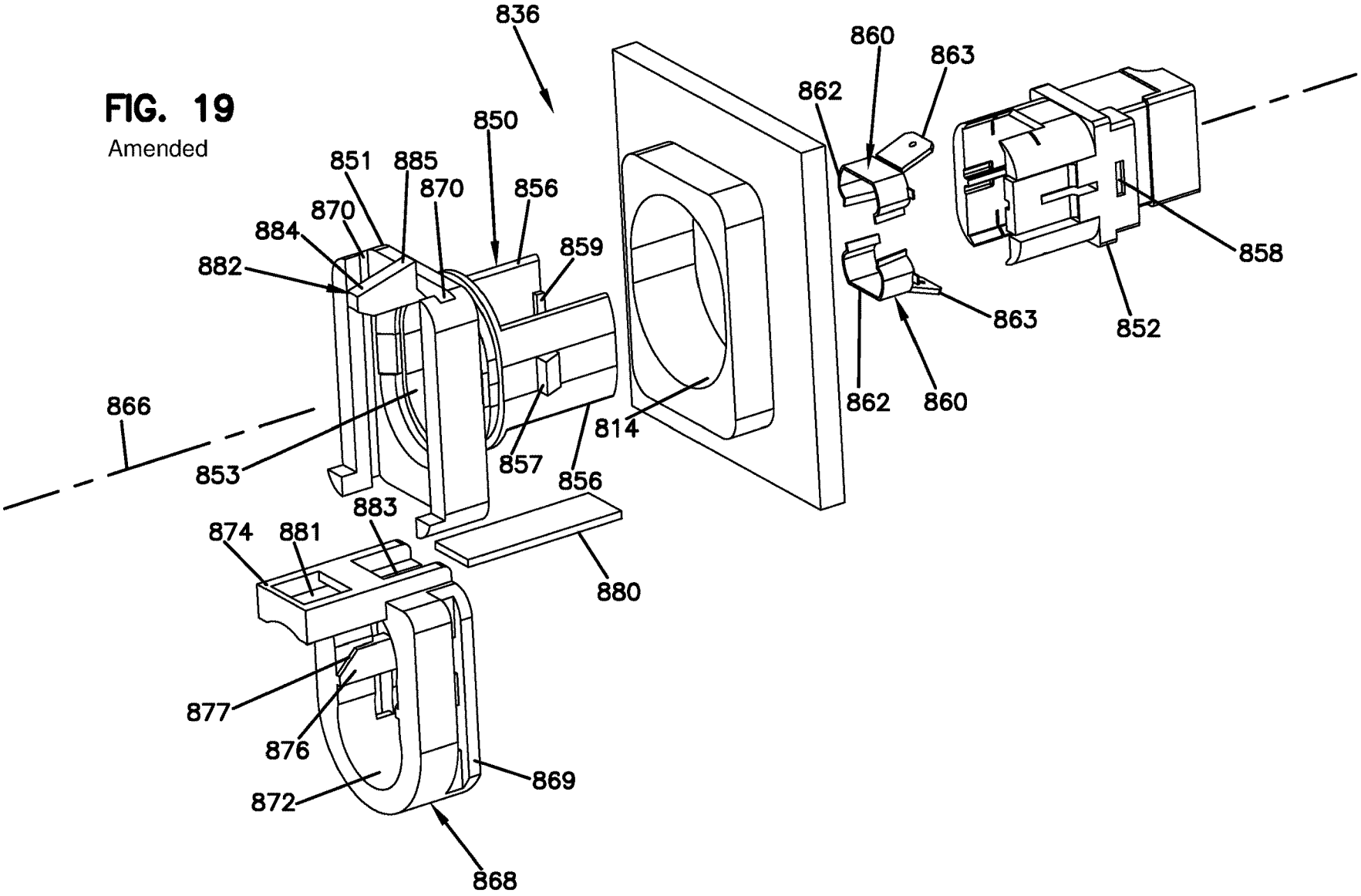
FIG. 19
Amended

FIG. 20
Amended
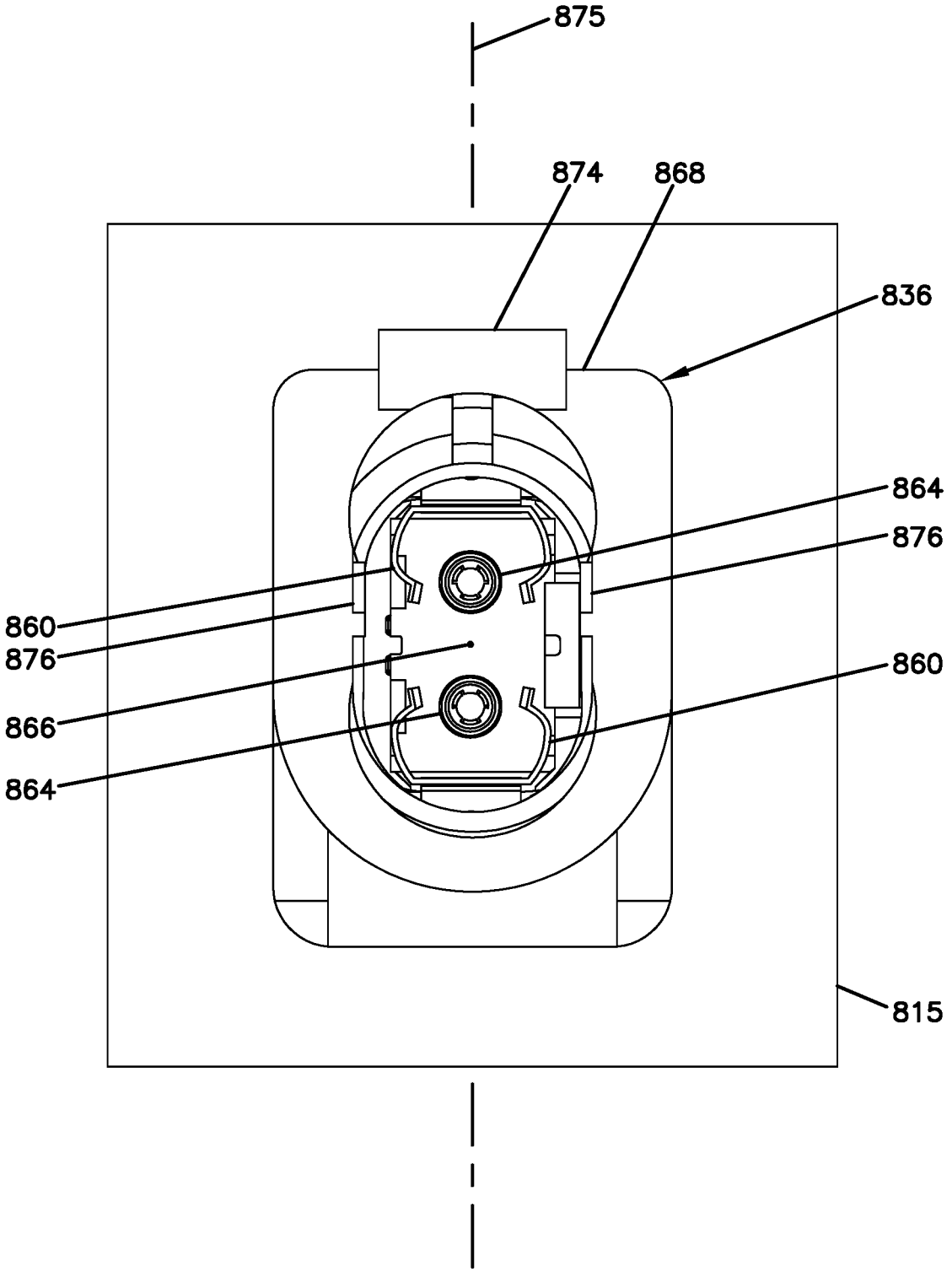

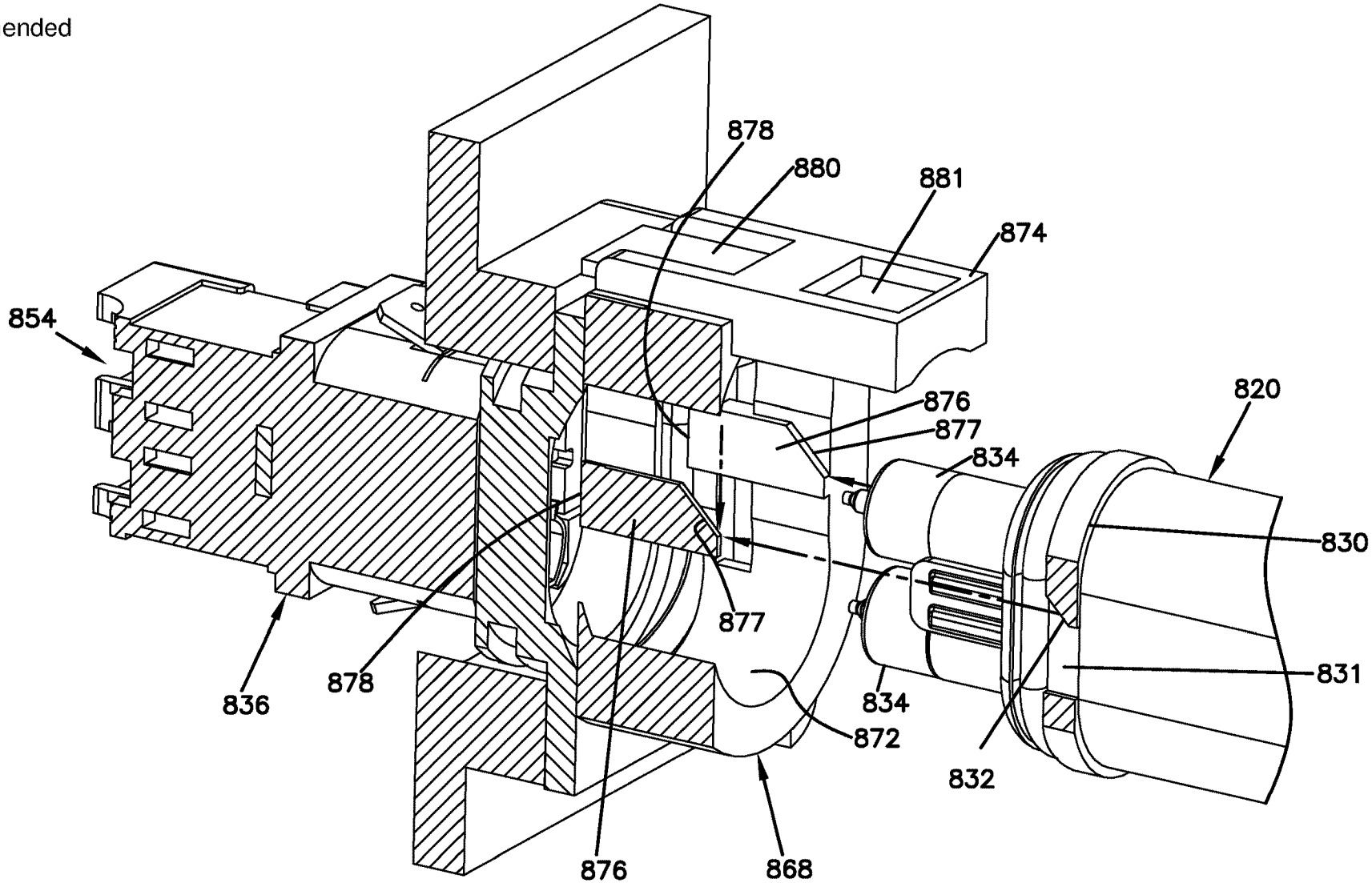
FIG. 21
Amended

TELECOMMUNICATIONS CONNECTION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is an application for reissue of U.S. Pat. No. 10,061,090 B2, which issued from U.S. application Ser. No. 15/300,147, filed Sep. 28, 2016, which* is a National Stage Application of PCT/EP2015/056720, filed Mar. 27, 2015, which claims the benefit of U.S. Provisional [Patent] Application [Ser.] No. 61/971,739, filed Mar. 28, 2014[, and which applications]. *International Application No. PCT/EP2015/056720, and U.S. Provisional Application No. 61/971,739* are incorporated herein by reference. To the extent appropriate, a claim of priority is made to each of the above disclosed applications.

BACKGROUND

In today's telecommunications market there is growing demand to support active devices such as fixed location transceivers for generating wireless communication coverage areas (e.g., Wi-Fi access points, macrocells, microcells, picocells, femtocells, other cell sizes, wireless hot spots, nodes, etc.), power-over-Ethernet extenders, Optical Network Terminals (ONT) that provide optical to electrical signal conversion, and IP devices (e.g., digital cameras such as security cameras, computing devices, etc.). There is also desire to support such devices with faster transmission rates, higher power and longer spans. To achieve faster transmission rates, it is desirable to support such active devices using an optical fiber network. However, traditional fiber optic networks are generally passive (e.g., passive optical local area networks (POLAN), fiber-to-the-home (FTTH), fiber-to-the-desk (FTTD), fiber-to-the-node (FTTN), fiber-to-the-curb (FTTC) and other network architectures) and therefore do not provide ready access to power. Thus, there is a need to support active devices with both electrical power and optical signals in a cost-effective manner. There is also a need to integrate hybrid connectivity (e.g., both electrical power and fiber optics) into existing fiber optic networks.

SUMMARY

Aspects of the present disclosure relate to connectors and connector systems capable of providing optical connections and electrical power connections in a telecommunications network such as a fiber optic network. In certain examples, the connectors and connector systems can be hardened (e.g., sealed and ruggedized) for use in outdoor environmental applications. In certain examples, the connectors and connector systems can be used to provide efficient power and fiber connections in a mobile network topology. In certain examples, the connectors and connector systems can be used with cables having central sections containing optical fibers and strippable outer sections including electrical power conductors. In certain examples, the hybrid connectors can be small form-factor connectors. In certain examples, the hybrid connectors can be suitable for use in indoor passive optical local area networks or outdoor networks. In certain examples, the hybrid connectors can include robust configurations for providing retention of the connectors within mating fiber optic adapters. In certain examples, active robust coupling structure can be provided with the fiber optic adapters rather than the connectors.

Another aspect of the present disclosure relates to a hybrid fiber optic connector including a connector body having a transverse cross-sectional shape. The connector body includes two generally cylindrical sleeves at a front of the connector body. The two generally cylindrical sleeves each include a separate ferrule mounted therein. Electrical contacts mount over the two generally cylindrical sleeves so as to be carried with the connector body.

A further aspect of the present disclosure relates to a fiber optic connector including a connector body that supports first and second ferrules each supporting an optical fiber. The fiber optic connector also includes first and second shutters pivotally movable relative to the connector body between open and closed positions. The first shutter corresponds to the first ferrule and the second shutter corresponds to the second ferrule. End faces of the first and second ferrules are covered when the first and second shutters are in the closed position. The end faces of the first and second ferrules are accessible when the first and second shutters are in the open position.

Still another aspect of the present disclosure relates to a hybrid fiber optic connector including a connector body that supports first and second ferrules each supporting an optical fiber. The hybrid fiber optic connector also includes electrical contacts mounted in a region between the first and second ferrules.

A further aspect of the present disclosure relates to a fiber optic connection system including a connector body that supports at least one ferrule supporting at least one optical fiber, and a fiber optic adapter defining a port for receiving the connector body. The fiber optic connection system also includes an environmental seal for providing a seal between the connector body and the fiber optic adapter. The fiber optic connection system further includes a robust active coupler mounted to the fiber optic adapter and not carried with the connector body. The robust active coupler is movable relative to the fiber optic adapter and is configured to retain the connector body within the port. The robust active coupler is configured to retain the connector body within the port so as to withstand a pull-out force of at least 25 pounds.

Still another aspect of the present disclosure relates to a fiber optic connection system including a connector body that supports at least one ferrule supporting at least one optical fiber, and a fiber optic adapter defining a port for receiving the connector body. The system also includes a slide clip mounted to the fiber optic adapter and not carried with the connector body. The slide clip is movable relative to the fiber optic adapter between a coupling position and non-coupling position. The slide clip is configured to retain the connector body within the port when in the coupling position, and is configured to allow removal of the connector body from the port when in the non-coupling position.

A further aspect of the present disclosure relates to a hardened fiber optic connection system. The system includes a fiber optic connector defining a longitudinal axis, and a fiber optic adapter defining a port for receiving the fiber optic connector. The system also includes a seal for providing environmental sealing between the fiber optic connector and the fiber optic adapter when the fiber optic connector is received within the port of the fiber optic adapter. The system further includes a retention clip mounted on the fiber optic connector or the fiber optic adapter for retaining the fiber optic connector within the port of the fiber optic adapter. The retention clip is configured to slide in a transverse orientation relative to the longitudinal axis between a coupling position and a non-coupling position. A spring is provided for biasing the retention clip towards the coupling position. The retention clip slides from the coupling position to the non-coupling position as the fiber optic connector is being axially inserted into the port of the fiber optic adapter. The spring move the retention clip from the non-coupling position back to the coupling position once the fiber optic connector has been fully axially inserted into the port of the fiber optic adapter.

BRIEF DESCRIPTION OF THE DRAWINGS

FIG. 1 is a system diagram showing an example distribution architecture including wireless coverage areas deployed using a power and optical fiber interface system;

FIG. 2 is a transverse cross-sectional view of an electrical power/optical fiber hybrid cable used in the architecture of FIG. 1 *and taken along section line 2-2 shown in FIG. 1*;

FIG. 6 is a perspective view of a hybrid electrical and fiber optic connector in accordance with the principles of the present disclosure;

FIG. 7 is another view of the hybrid electrical and fiber optic connector in accordance with the principles of the present disclosure;

FIG. 8 is a front end view of the hybrid electrical and fiber optic connector of FIGS. 6 and 7;

FIG. 9 shows a fiber optic adapter configured to receive the hybrid electrical and fiber optic connector of FIGS. 6-8 within an outer port of the fiber optic adapter;

FIG. 10 is another view of the fiber optic adapter of FIG. 9;

FIG. 11 is still another view of the fiber optic adapter of FIG. 9;

FIG. 12 is an end view of the adapter of FIGS. 9-11 showing an inner end defining an inner port adapted to receive LC fiber optic connectors (e.g., duplex LC connectors);

FIG. 16 shows another hybrid optical and electrical connection system in accordance with the principles of the present disclosure;

FIG. 18 is a front end view of the hybrid connector of FIG. 17;

FIG. 19 is an exploded view of a hybrid adapter of the hybrid optical and electrical connection system of FIG. 16;

FIG. 20 is a partial cross-sectional view of the hybrid optical and electrical connection system of FIG. 16;

FIG. 21 is a cross-sectional view showing the hybrid connector aligned with a port of the hybrid adapter, a slide clip of the hybrid adapter is shown in a coupling position;

DETAILED DESCRIPTION

Figure 3:
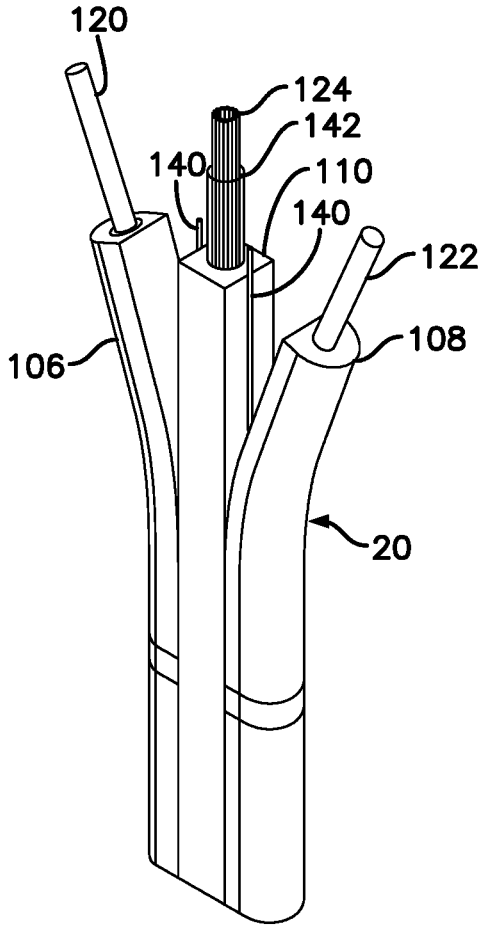
FIG. 3 is a perspective view of a portion of the hybrid cable of FIG. 2 with electrically conductive portions of the cable showing separated from a central optical fiber portion of the cable.

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

FIG. 1 shows a system 10 in accordance with the principles of the present disclosure for enhancing the coverage areas provided by cellular technologies (e.g., GSM, CDMA, UMTS, LTE, WiMax, WiFi, etc.). The system 10 includes a base location 11 (i.e., a hub) and a plurality of wireless coverage area defining equipment 12a, 12b, 12c, 12d, 12e and 12f (sometimes collectively referred to as equipment 12 herein) distributed about the base location 11. In certain examples, the base location 11 can include a structure 14 (e.g., a closet, hut, building, housing, enclosure, cabinet, etc.) protecting telecommunications equipment such as racks, fiber optic adapter panels, passive optical splitters, wavelength division multiplexers, fiber splice locations, optical fiber patching and/or fiber interconnect structures and other active and/or passive equipment. In the depicted example, the base location 11 is connected to a central office 16 or other remote location by a fiber optic cable such as a multi-fiber optical trunk cable 18 that provides high bandwidth two-way optical communication between the base location 11 and the central office 16 or other remote location.

In the depicted example, the base location 11 is connected to the wireless coverage area defining equipment 12a, 12b, 12c, 12d, 12e and 12f by hybrid cables 20. The hybrid cables 20 are each capable of transmitting both power and communications between the base location 11 and the wireless coverage area defining equipment 12a, 12b, 12c, 12d, 12e and 12f.

The wireless coverage area defining equipment 12a, 12b, 12c, 12d, 12e and 12f can each include one or more wireless transceivers 22. The transceivers 22 can include single transceivers 22 or distributed arrays of transceivers 22. As used herein, a "wireless transceiver" is a device or arrangement of devices capable of transmitting and receiving wireless signals. A wireless transceiver typically includes an antenna [for enhancing] *that enhances* receiving and transmitting [the] wireless signals. Wireless coverage areas are defined around each of the wireless coverage area defining equipment 12a, 12b, 12c, 12d, 12e and 12f. Wireless coverage areas can also be referred to as cells, cellular coverage areas, wireless coverage zones, or like terms. Examples of and/or alternative terms for wireless transceivers include radio-heads, wireless routers, cell sites, wireless nodes, etc.

In the depicted example of FIG. 1, the base location 11 is shown as a base transceiver station (BTS) located adjacent to a radio tower 24 supporting and elevating a plurality *of* the wireless coverage area defining equipment 12a. In one example, the equipment 12a can define wireless coverage areas such as [a] macrocells or microcells (i.e., cells each having a coverage area less than or equal to about 2 kilometers wide). The wireless coverage area defining equipment 12b is shown deployed at a suburban environment (e.g., on a light pole in a residential neighborhood) and the equipment 12c is shown deployed at a roadside area (e.g., on a roadside power pole). The equipment 12c could also be installed at other locations such as tunnels, canyons, coastal areas, etc. In one example, the equipment 12b, 12c can define wireless coverage areas such as microcells or picocells (i.e., cells each having a coverage area equal to or less than about 200 meters wide). The equipment 12d is shown deployed at a campus location (e.g., a university or corporate campus), the equipment 12e is shown deployed at a large public venue location (e.g., a stadium), and the equipment 12f is shown installed at an in-building or near-building environment (e.g., multi-dwelling unit, high rise, school, etc.). In one example, the equipment 12d, 12e, and 12f can define wireless coverage areas such as microcells, picocells, or femtocells (i.e., cells each having a coverage area equal to or less than about 10 meters wide).

The wireless coverage area defining equipment 12 are often located in areas without power outlets conveniently located. As noted above, the hybrid cable 20 provides both power and data to the equipment 12. FIG. 2 is a transverse cross-sectional view taken through an example of one of the hybrid cables 20 of FIG. 1. Hybrid cable 20 includes an outer jacket 100 having a transverse cross-sectional profile that defines a major axis 102 and a minor axis 104. The outer jacket has a height H measured along the minor axis 104 and a width W measured along the major axis 102. The width W is greater than the height H such that the transverse cross-sectional profile of the outer jacket 100 is elongated along the major axis 102.

The outer jacket 100 can include a left portion 106, a right portion 108 and a central portion 110. The left portion 106, the right portion 108 and the central portion 110 can be positioned along the major axis 102 with the central portion 110 being disposed between the left portion 106 and the right portion 108. The left portion 106 can define a left passage 112, the right portion 108 can define a right passage 114 and the central portion 110 can define a central passage 116. The passages 112, 114 and 116 can have lengths that extend along a central longitudinal axis 118 of the cable 20 for the length of the cable. A left electrical conductor 120 is shown positioned within the left passage 112, a right electrical conductor 122 is shown positioned within the right passage 114 and at least one optical fiber 124 is shown positioned within the central passage 116. Certain embodiments include from 1 to 12 fibers 124, for example. The left electrical conductor 120, the right electrical conductor 122 and the optical fiber 124 have lengths that extend along the central longitudinal axis 118 of the cable 20.

Still referring to FIG. 2, the hybrid cable 20 includes a left pre-defined tear location 126 positioned between the central portion 110 and the left portion 106 of the outer jacket 100, and a right pre-defined tear location 128 positioned between the central portion 110 and the right portion 108 of the outer jacket 100. The left pre-defined tear location 126 is weakened such that the left portion 106 of the outer jacket 100 can be manually torn from the central portion 110 of the outer jacket 100. Similarly, the right pre-defined tear location 128 is weakened such that the right portion 108 of the outer jacket 100 can be manually torn from the central portion 110 of the outer jacket 100. The left pre-defined tear location 126 is configured such that the left portion 106 of the outer jacket 100 fully surrounds the left passage 112 and the central portion 110 of the outer jacket 100 fully surrounds the central passage 116 after the left portion 106 of the outer jacket 100 has been torn from the central portion 110 of the outer jacket 100. In this way, the left electrical conductor 120 remains fully insulated and the optical fiber [120] *124* remains fully protected after the left portion 106 has been torn from the central portion 110. The right pre-defined tear location 128 is configured such that the right portion 108 of the outer jacket 100 fully surrounds the right passage 114 and the central portion 110 of the outer jacket 100 fully surrounds the central passage [119] *116* after the right portion 108 of the outer jacket 100 has been torn from the central portion 110 of the outer jacket 100. In this way, the right electrical conductor 122 remains fully insulated and the optical fiber 124 remains fully protected after the right portion 108 has been torn from the central portion 110.

FIG. 3 shows the hybrid cable 20 with both the left portion 106 and the right portion 108 torn away from the central portion 110. In this configuration, both the left electrical conductor 120 and the right electrical conductor 122 are fully insulated by their corresponding left and right portions 106, 108. Additionally, the central portion 110 has a rectangular transverse cross-sectional shape that fully surrounds the central passage 116 so as to protect the optical fiber or fibers 124.

It will be appreciated that the left and right electrical conductors 120, 122 have a construction suitable for carrying electricity. It will be appreciated that the electrical conductors can have a solid or stranded construction. Example sizes of the electrical conductors include 12 gauge, 16 gauge, or other sizes.

The outer jacket 100 is preferably constructed of a polymeric material. In one example, the hybrid cable 20 and the outer jacket 100 are plenum rated. In certain examples, the outer jacket 100 can be manufactured of a fire-retardant plastic material. In certain examples, the outer jacket 100 can be manufactured of a low smoke zero halogen material. Example materials for the outer jacket include polyvinyl chloride (PVC), fluorinated ethylene polymer (FEP), polyolefin formulations including, for example, polyethylene, and other materials.

The central passage 116 can contain one or more optical fibers 124. In certain examples, the optical fibers 124 can be coated optical fibers having cores less than 12 microns in diameter, cladding layers less than 240 microns in diameter, and coating layers less than 300 microns in diameter. It will be appreciated that the core and cladding layers typically include a silica based material. In certain examples, the cladding layer can have an index of a refraction that is less than the index of refraction of the core to allow optical signals that are transmitted through the optical fibers to be confined generally to the core. It will be appreciated that in certain examples, multiple cladding layers can be provided. In certain examples, optical fibers can include bend insensitive optical fibers having multiple cladding layers separated by trench layers. In certain examples, protective coatings (e.g., a polymeric material such as actelate) can form coating layers around the cladding layers. In certain examples, the coating layers can have diameters less than 300 microns, or less than 260 microns, or in the range of 240 to 260 microns. In certain examples, the optical fibers 124 can be unbuffered. In other examples, the optical fibers can include a tight buffer layer, a loose buffer layer, or a semi-tight buffer layer. In certain examples, the buffer layers can have an outer diameter of about 800 to 1,000 microns. The optical fibers can include single mode optical fibers, multi-mode optical fibers, bend insensitive fibers or other fibers. In still other embodiments, the optical fibers 124 can be ribbonized.

Figure 4:
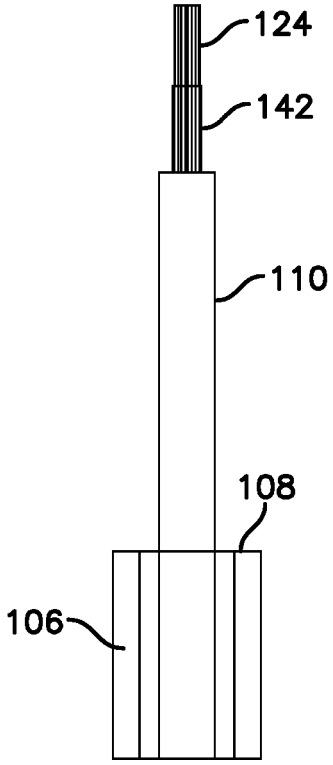
FIG. 4 is a plan view of the hybrid cable of FIGS. 2 and 3 with the electrically conductive portions of the hybrid cable trimmed relative to the central fiber optic portion of the hybrid cable.

As shown at FIG. 4, the left and right portions 106, 108 can be trimmed relative to the central portion 110 after the left and right portions 106, 108 have been torn away from the central portion 110. In this configuration, the central portion 110 extends distally beyond the ends of the left and right portions 106, 108. In certain examples, insulation displacement connectors can be used to pierce through the jacket materials of the left and right portions 106, 108 to electrically connect the left and right electrical connectors 120, 122 to an electrical power source, ground, active components or other structures. It will be appreciated that the optical fibers 124 can be connected to other fibers with mechanical or fusion splices, or directly terminated with optical connectors. In other examples, connectorized pigtails can be spliced to the ends of the optical fibers 124.

Referring back to FIG. 2, the outer jacket 100 includes a top side 130 and a bottom side 132 separated by the height H. As depicted, the top and bottom sides 130, 132 are generally parallel to one another. Each of the left and right pre-defined tear locations 126, 128 includes an upper slit 134 that extends downwardly from the top side 130, a lower slit 136 that extends upwardly from the bottom side 132 and a non-slitted portion 138 positioned between the upper and lower slits 134, 136. In one example embodiment, the upper and lower slits 134, 136 are partially re-closed slits. In the depicted embodiment, the left and right pre-defined tear locations 126, 128 also include jacket weakening members 140 that are imbedded in the non-slitted portions 138. By way of example, the jacket weakening members 140 can include strands, monofilaments, threads, filaments or other members. In certain examples, the jacket weakening members 140 extend along the central longitudinal axis 118 of the cable 20 for the length of the cable 20. In certain examples, the jacket weakening members 140 are aligned along the major axis 102. In certain examples, the upper and lower slits 134, 136 as well as the jacket weakening member 140 of the left pre-defined tear location 126 are aligned along a left tearing plane PL that is oriented generally perpendicular relative to the major axis 102. Similarly, the upper and lower slits 134, 136 as well as the jacket weakening member 140 of the right pre-defined tear location 128 are aligned along a right tearing plane PR that is oriented generally perpendicular with respect to the major axis 102.

Referring again to FIG. 2, the hybrid cable 20 can include a tensile strength structure 142 that provides tensile enforcement to the hybrid cable 20 so as to prevent tensile loads from being applied to the optical fibers 124. In certain embodiments, the tensile strength structure 142 can include reinforcing structures such as Aramid yarns or other reinforcing fibers. In still other embodiments, the tensile strength structure 142 can have an oriented polymeric construction. In still other examples, a tensile strength structure 142 can include a reinforcing tape. In certain examples, the reinforcing tape can be bonded to the outer jacket 100 so as to line the central passage 116. In certain examples, no central buffer tube is provided between the optical fibers 124 and the tensile reinforcing structure 142. In certain examples, the tensile strength structure 142 can include a reinforcing tape that extends along the length of the hybrid cable 20 and has longitudinal edges/ends [144] that are separated so as to define a gap 144 therein between. In use, the tensile strength member 142 can be anchored to a structure such as a fiber optic connector, housing or other structure so as to limit the transfer of tensile load to the optical fibers 124. It will be appreciated that the tensile strength structure 142 can be anchored by techniques such as crimping, adhesives, fasteners, bands or other structures.

Figure 5:
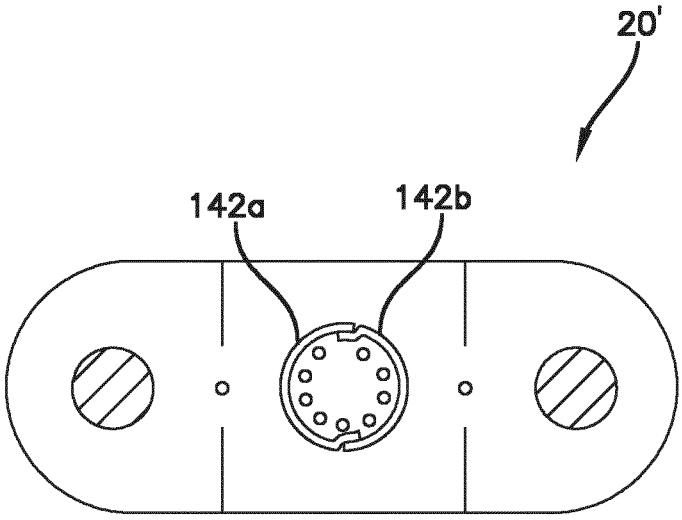
FIG. 5 is a transverse cross-sectional view of another electrical power/optical fiber hybrid cable in accordance with principles of the present disclosure.

FIG. 5 shows an alternative hybrid cable 20' having the same construction as the hybrid cable 20 except two tensile strength structures 142a, 142b have been provided within the central passage 116. Tensile strength members 142a, 142b each include a tensile reinforcing tape that is bonded to the central portion 110 of the outer jacket 100. The tensile strength members 142a, 142b can include portions that circumferentially overlap one another within the central passage 116. In certain examples, by stripping away an end portion of the central portion 110, the tensile strength structures 142a, 142b can be exposed and readily secured to a structure such as a fiber optic connector, a panel, a housing or other structure.

As noted above, the electrical conductors 120, 122 could be 12 gauge (AWG) or 16 gauge, for example. In certain examples, a 12 gauge conductor 120, [120] *122* provides up to 1175 meter reach at 15 W, and a 750 meter reach for 25 W devices. The 16 gauge implementations can provide reduced cost for shorter reach applications or lower power devices, for example.

Providing power to remote active devices such as the wireless coverage area defining equipment 12 is often difficult and expensive. Providing required power protection and backup power further complicates powering such remote devices. Optical Network Terminals (ONT's) and Small Cell devices (such as picocells and metrocells) have "similar" power requirements. For example, 25 W, 12 VDC or 48 VDC devices are common, although variations occur.

FIG. 6 illustrates a hybrid electrical and fiber optic connector 620 in accordance with the principles of the present disclosure. In one example, the connector 620 is adapted to be used in combination with the hybrid cable 20 and includes ferrules 622 that receive optical fibers of the hybrid cable 20 and also includes electrical contacts 624 that are adapted to be electrically connected to the electrical conductors 120, 122 of the hybrid cable 20. The connector 620 includes a connector body 626 having a transverse cross-sectional shape that complements or matches the transverse cross-sectional shape of the hybrid cable 20. For example, the transverse cross-sectional shape of the connector body 626 can be elongate and generally oval shaped. In one example, the transverse cross-sectional shape of the connector body 626 can include a major axis M1 and a minor axis M2 (see FIG. 8), with a height H1 measured along the minor axis M2 and a width W1 measured along the major axis M1. Preferably, the width W1 is greater than the height H1 such that the transverse cross-sectional profile of the connector body 626 is elongated along the major axis M1. In certain examples, opposite ends of the connector body 626 are rounded. In certain examples, the transverse cross-sectional profile of the connector body 626 has major sides 627 that are positioned on opposite sides of the major axis M1 and that extend along the width W1. The transverse cross-sectional profile of the connector body 626 also includes minor sides 629 that positioned on opposite sides of the minor axis M2 that extend along the height H1 between the major sides 627. The major sides 627 are parallel and extend between the minor sides 629. The minor sides 629 form opposite rounded ends of the transverse cross-sectional profile.

Referring to FIGS. 6 and 7, the connector body 626 includes two forwardly positioned, cylindrical sleeves 628. The ferrules 622 are mounted within the [sleeve] *sleeves* 628. An intermediate structure 630 can be positioned generally between the [sleeve] *sleeves* 628. Intermediate [structures] *structure* 630 can include a key feature 632 that ensures the connector 620 is inserted into an adapter at a suitable rotational orientation. The intermediate structure 630 can also include catches or latch features adapted to engage a latch of an adapter for receiving the connector 620. The connector body 626 defines a first peripheral groove 634 for receiving a sealing member or element such as an O-ring. The connector body 626 also includes another peripheral groove 636 (e.g., second peripheral groove) spaced from the peripheral groove 634. The second peripheral groove 636 can be adapted for receiving a retention member of an adapter configured for receiving the connector 620. For example, when the connector 620 is inserted within the adapter, the retention member can be slid or otherwise moved into the second peripheral groove 636 so as to lock the connector 620 within the adapter.

Referring still to FIGS. 6 and 7, the electrical contacts 624 *are* depicted as electrically conductive bands or sleeves that mount over the [sleeve] *sleeves* 628. In certain examples, the bands or sleeves can include an electrically conductive material such as metal.

FIGS. 9-12 illustrate an adapter 638 configured for receiving the connector 620. In certain examples, adapter 638 is configured for optically coupling the optical fibers supported by the connector 620 to [responding] *corresponding* optical fibers of other optical connectors. Additionally, the adapter 638 is configured for electrically connecting the electrical [contact] *contacts* 624 to electrical contacts of the adapter. Electrical contacts of the adapter allow power to be routed from the connector 620 to one or more active components in need of power. Thus, optical signals can be configured to pass through the adapter 638 from the connector 620 to one or more other fiber optic connectors, while electrical power from the connector 620 is routed laterally out from the connector 620 and is not directed to the corresponding fiber optic connectors.

As depicted at FIGS. 9-11, adapter 638 includes opposite receptacles 640, 642. The receptacle 640 is adapted for receiving the connector 620, and the receptacle 642 is adapted for receiving standard fiber optic connectors (e.g., LC connectors or other types of fiber optic connectors). The adapter 638 includes internal alignment sleeves 644 for coaxially aligning the ferrules 622 of the connector 620 with corresponding ferrules of the connectors inserted within the receptacle 642. The adapter 638 can include an internal flexible latch adapted for engaging the latch feature on the connector 620. The adapter 638 also includes a locking element 646 (e.g., a clip or wedge) that is slid into the peripheral groove 636 when the connector 620 is inserted within the receptacle 640 so as to lock the connector 620 within the receptacle 640. It will be appreciated that the locking element 646 can be slid relative to the main body of the adapter 638 between a locking position and a non-locking position. When the connector 620 is inserted within the receptacle 640, the seal within the first peripheral groove 634 can provide a peripheral seal between the exterior of the connector body 626 and a corresponding sealing surface provided within the receptacle 640 of the adapter 638. It will be appreciated that the seal may be optional for certain applications such as indoor applications.

In certain examples, the locking element 646 can slide along the major axis M1 of the connector 620 when moving between the locking and unlocking positions. When in the locking position, the locking element 646 can engage the connector 620 on opposite sides of the connector body [628] *626*. For example, the locking element 646 can engage both of the major sides 627 of the transverse cross-sectional profile of the connector body [628] *626* so that retaining engagement is provided on opposite sides of the major axis M1. In other examples, an alternate locking element may slide along the minor axis M2 and provide retaining engagement on opposite sides of the minor axis M2 (e.g., the locking element may engage both of the minor sides of the transverse cross-sectional profile of the connector).

In certain examples, the locking element 646 provides robust retention of the connector body [628] *626* within the fiber optic adapter 638. In certain examples, the locking element 646 engages the connector body [628] *626* such that the connection can resist a pull-out force of at least 25 pounds or at least 50 pounds. In certain examples, the locking element 646 can be mounted with the fiber optic adapter 638 and not carried with the connector body [628] *626*. Thus, the active portion (i.e., the movable portion) of the robust retention system can be provided with the fiber optic adapter and not the connector. This allows the fiber optic connector to have a transverse cross-sectional shape with a relatively small form factor. A connector with a small cross-sectional form factor can assist in routing connectorized cables along various pathways having relatively small clearances. In one example, the maximum width W1 of the transverse cross-sectional shape of the connector 620 is less than 2 centimeters and the maximum height H1 of the transverse cross-sectional shape of the connector 620 is less than 1.5 centimeters. In one example, the maximum width W1 is about 1.8 centimeters and the maximum height H1 is about 1.2 centimeters. In certain examples, the active portion of the retention system that is integrated within the adapter can include a slide clip. In other examples, the active portion of the retention system that is integrated or otherwise included with the adapter includes other structures such as rotating sleeves, collars, nuts or other fastening elements that may include fastening parts such as threads, bayonet structures or other structures.

The adapter 638 can include an adapter flange 648 and an external latch 650. The flange 648 and the latch 650 can be configured to secure the adapter 638 within an opening such as an opening in a panel or in an enclosure. In certain examples, *a* seal can be provided adjacent the flange for providing a seal between the adapter 638 and the structure to which the adapter is mounted.

Referring to FIGS. 9 and 10, electrical contacts 652 are mounted on opposite sides of the main body of the adapter 638. The electrical contacts include internal portions 654 that are positioned within the receptacle 640 and that are adapted to engage the electrical contacts 624 of the connectors 620 when the connector 620 is secured within the receptacle 640. The electrical contacts 652 also include external portions 656 that project outwardly from the main body of the adapter 638 so as to be accessible from the exterior of the adapter 638. The external portions 656 can be electrically connected (e.g., wired or otherwise electrically connected) to active devices in need of electrical power from the hybrid cable 20.

Referring to FIG. 11, the main body of the adapter 638 can have a two-piece construction including a first piece 658 defining the receptacle 640 and a second piece 660 defining one or more ports corresponding to the receptacle 642. In certain examples, first and second parts can be interconnected by a snap-fit connection. As shown at FIGS. 11 and 12, the second piece of the adapter 638 defines the receptacle 642 and the receptacle 642 has a duplex configuration configured for receiving two LC-style fiber optic connectors.

Figure 13:
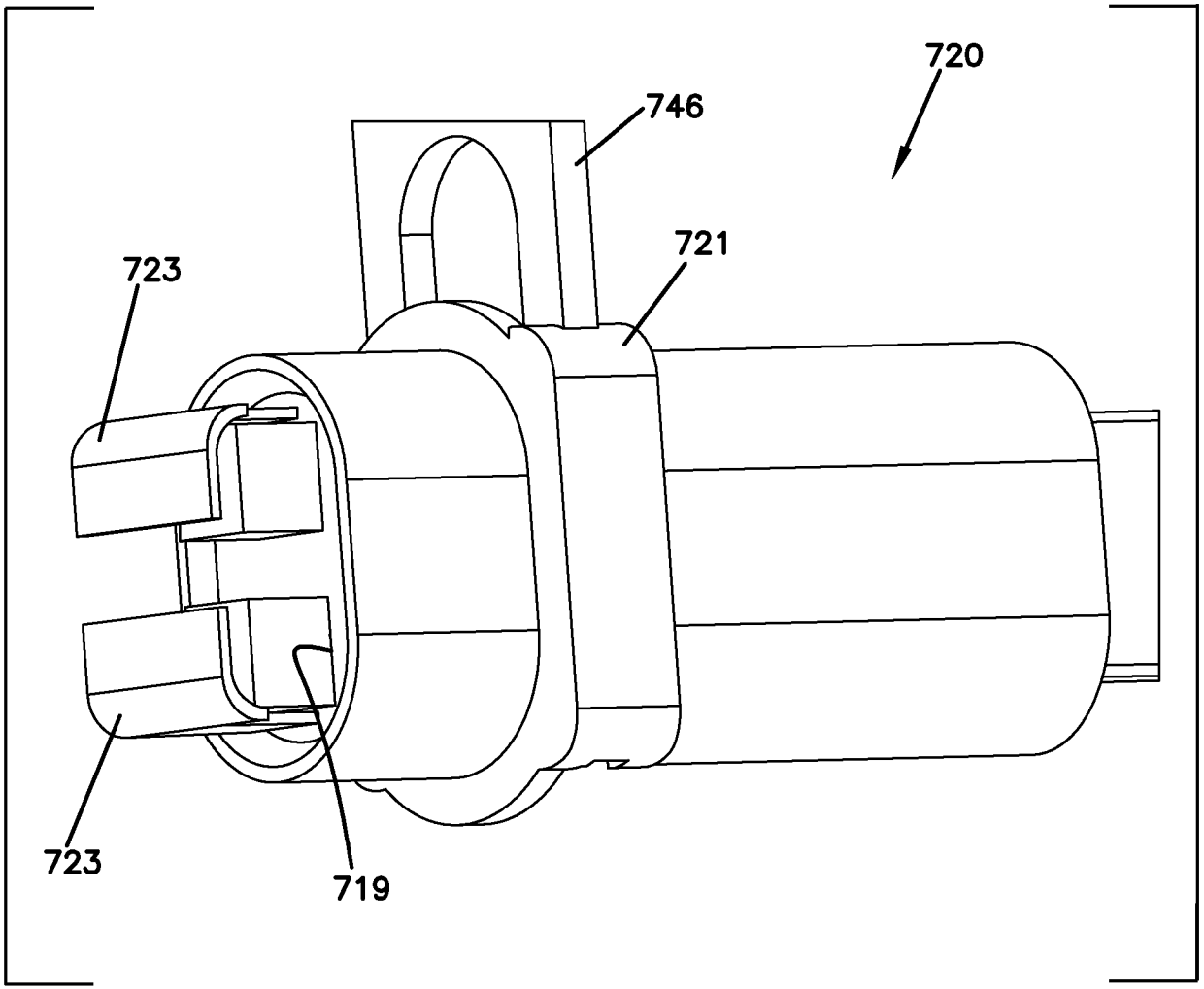
[FIG. 13 shows another hybrid electrical and fiber optic connector in accordance with the principles of the present disclosure with protective shutters shown in a closed position suitable for covering the ferrule ends;]
Figure 14:
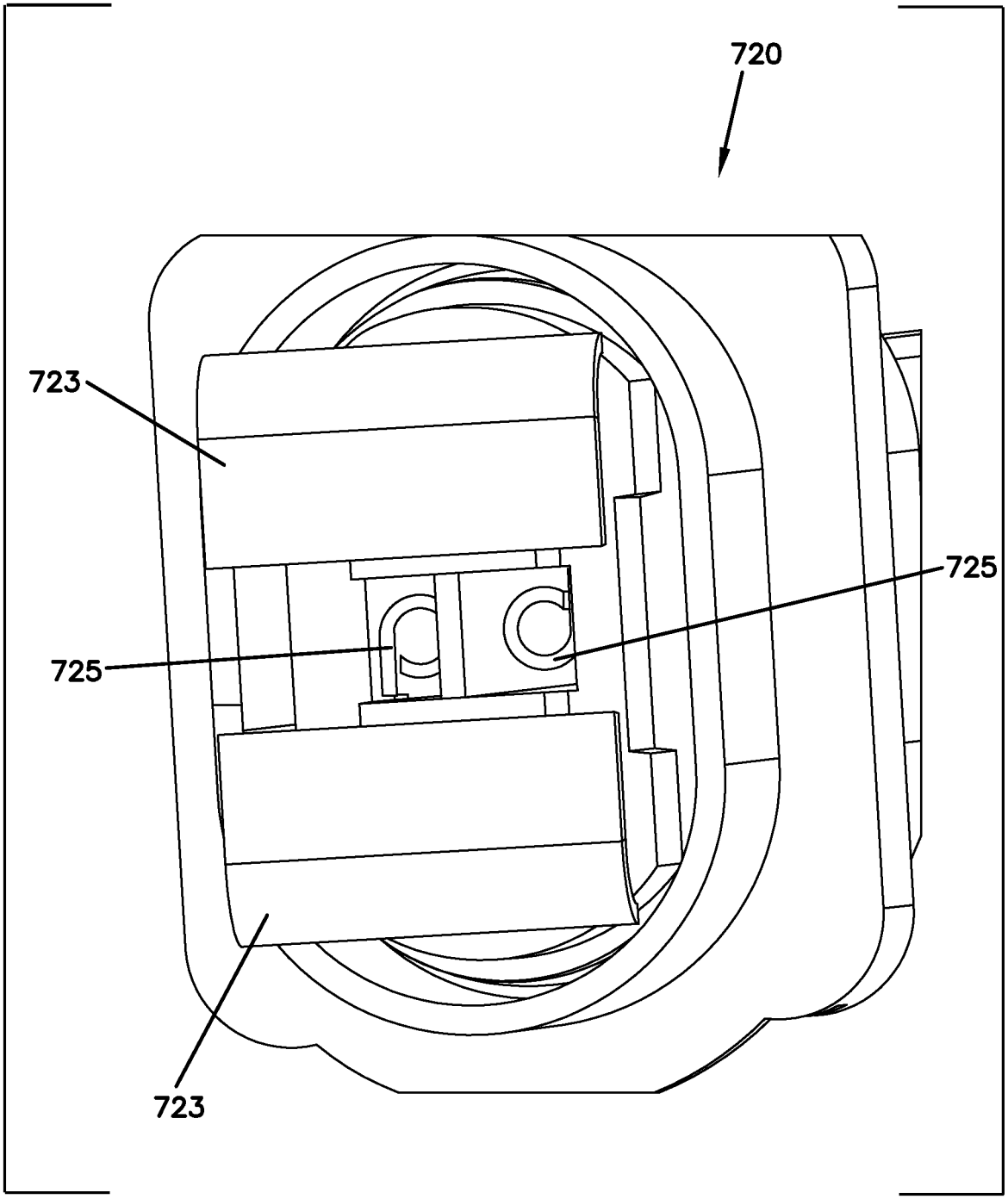
[FIG. 14 is another view of the hybrid electrical and fiber optic connector of FIG. 13 with the shutters in the closed position;]
Figure 15:
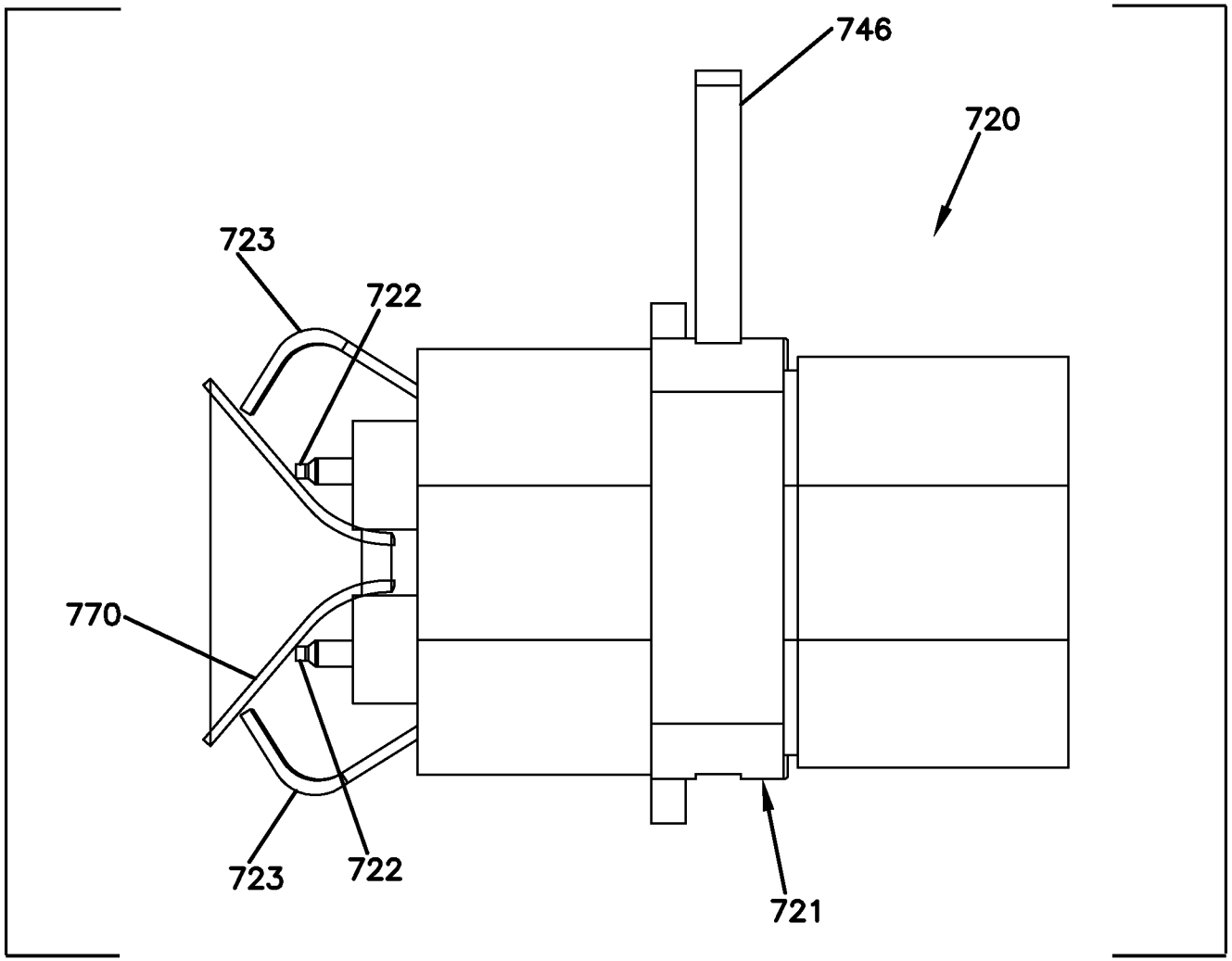
[FIG. 15 illustrates the hybrid electrical and fiber optic connector of FIGS. 13 and 14 with shutters shown in an open position;]

[FIGS. 13-15 illustrate an alternative hybrid electrical and fiber optic connector 720 in accordance with the principles of the present disclosure. The connector 720 includes two separate ferrules 722 mounted in corresponding sleeves of a connector body 719. When the connector 720 is not fully inserted within an adapter 721, shutters 723 protect end faces of the ferrules 722. As shown at FIG. 14, electrical contacts 725 can be provided at a center position between the two ferrules 722. Electrical contacts 725 are adapted to be connected to the electrical conductors of the hybrid cable 20 when the connector 720 is mounted to the end of the hybrid cable 20. Similarly, the separate ferrules 722 are adapted to receive optical fibers of the hybrid cable 20 when the connector 720 is mounted at the end of the cable 20. Similar to the previously described embodiment, the connector 720 can be secured within a corresponding adapter such as the adapter 721. The adapter 721 can include a connector retention feature such as a slide clip 746 of the type previously described. In certain examples, the adapter can include ramp structures 770 for automatically moving the shutters 723 from a closed position to an open position as the connector 720 is fully inserted within the adapter 721 (see FIG. 15). It will be appreciated that the connector body 719 of the connector 720 can have an elongate transverse cross-sectional shape and size comparable to the connector 620.]

In certain alternative examples, a sliding retention element or component (e.g., a slide clip) can be carried with the connector. When the connector is inserted within its corresponding adapter, the sliding retention element can be moved from a non-retaining position to a retaining position. With the clip in the retaining position, the connector is effectively locked within the adapter.

FIG. 16 illustrates a hybrid electrical and fiber optic connection system 810 in accordance with the principles of the present disclosure. The connection system 810 is adapted to provide both optical (e.g., for fiber optic communications) and electrical (e.g., for electrical power) connectivity. The connection system 810 includes a hybrid connector 820 configured to mate with a corresponding hybrid adapter 836. The hybrid connector 820 is shown mounted at the end of a hybrid cable 811. The hybrid cable 811 is shown having an outer jacket with an elongate cross-sectional shape (i.e., flat cable). A plurality of optical fibers 812 extend through a central passage defined by the jacket. In one example, two optical fibers 812 are provided within the jacket of the hybrid cable 811. Electrical conductors 813 also extend through the jacket of the hybrid cable 811. The electrical conductors 813 are positioned on opposite sides of the central passage containing the optical fibers 812. The hybrid adapter 836 is shown mounted within a port 814 (see FIG. 19) of a structure 815 (e.g., a panel, a wall, a wall of a housing, etc.). In certain examples, the structure 815 can include an enclosure such as an optical network terminal, a camera housing, an enclosure housing wireless connectivity equipment such as small cell devices, or other types of enclosures.

Figure 17:
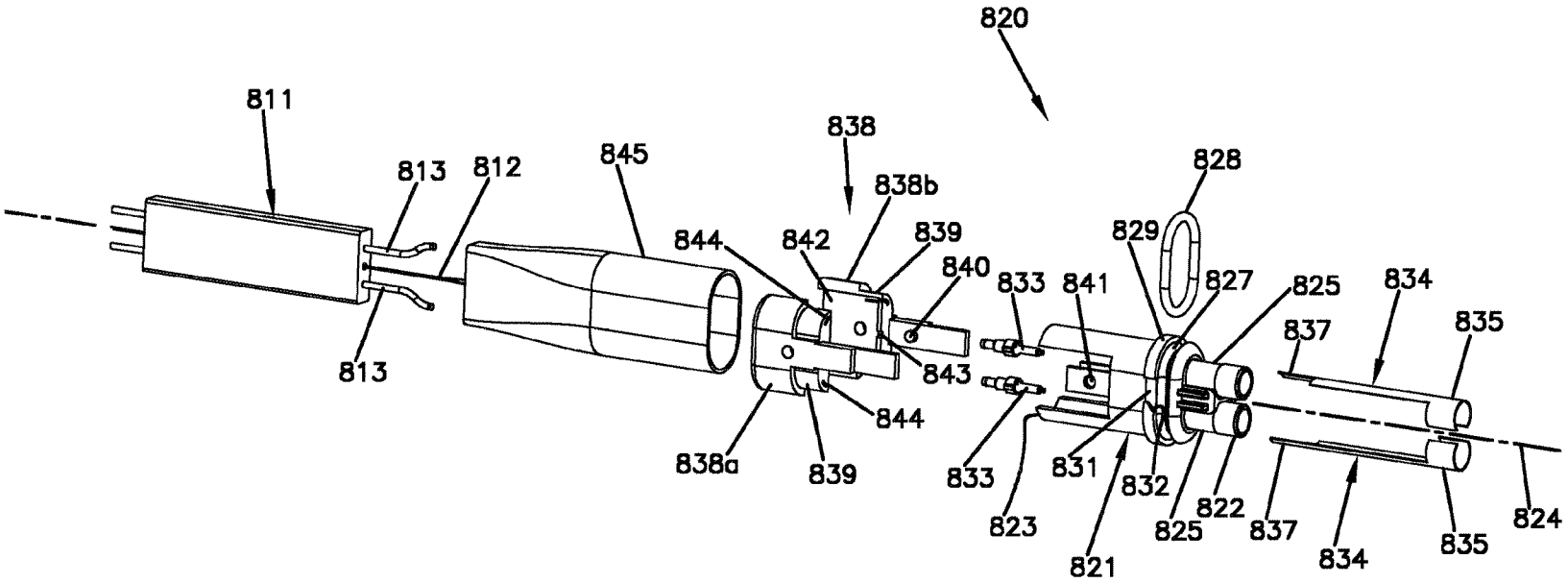
FIG. 17 is an exploded view of a hybrid connector of the hybrid optical and electrical connection system of FIG. 16.

Referring to FIG. 17, the hybrid connector 820 includes a connector body 821 having a front end 822 and a rear end 823. A longitudinal axis 824 of the connector extends through the hybrid connector 820 in front-to-rear direction. Two front sleeves 825 are provided at the front end 822 of the connector body 821. Keying structures 826 (*see FIG. 18*) are provided in a region generally between the front sleeves 825. The keying structures 826 can mate with corresponding keying structures provided in the hybrid adapter [830] *836* to ensure that the hybrid connector is oriented in the proper rotational orientation when inserted into the hybrid adapter 836.

Referring still to FIG. 17, the connector body 821 defines a peripheral groove 827 that extends around the longitudinal axis 824 and about a circumference of the connector body 821. The peripheral groove 827 is adapted for receiving a seal 828 that provides an environmental seal between the connector body 821 and the hybrid adapter 836 when the hybrid connector 820 is mated with the hybrid adapter 836. The connector body 821 also includes a peripheral retention flange 829 that extends around the longitudinal axis 824 and about the circumference of the connector body 821. The retention flange 829 includes a retention surface 830 (*see FIG. 16*) that faces in a rearward direction such that the retention surface 830 faces outwardly from the hybrid adapter 836 when the hybrid connector 820 is being inserted therein. The retention flange 829 defines side notches 831 which are formed by gaps in the retention flange 829. Ramps 832 can be provided at the side notches 831.

As indicated above, the hybrid connector 820 can be configured to provide both fiber optic and electrical conductivity. In this regard, ferrules 833 supporting the optical fibers 812 of the hybrid cable 811 can be mounted within the cylindrical front sleeves 825. In certain examples, one ferrule 833 can be mounted within each of the front sleeves 825. In certain examples, the ferrules 833 can be spring-biased in a forward direction relative to the connector body 821. The hybrid connector 820 also includes connector electrical contacts 834 having partial cylinders 835 that mount over the front sleeves 825. The connector electrical contacts 834 also include rear tails 837 that extend rearwardly through the connector body 821. The rear tails 837 are adapted to be electrically connected to the electrical conductors 813 of the hybrid cable 811.

The hybrid connector 820 can also include a rear housing 838 that mounts to the rear end 823 of the connector body 821 by means such as a snap-fit connection or other connection technique. The rear housing 838 includes two mating half-pieces 838a, 838b that mount to the rear end 823 of the connector body 821. In certain examples, forward portions 839 of the half-pieces 838a, 838b can fit inside the rear end 823 of the connector body 821. Tabs 840 of the rear housing 838 can snap within corresponding openings 841 of the connector body 821 to retain the rear housing 838 in place relative to the connector body 821. The rear housing 838 can define an interior receptacle 842 having an elongate transverse cross-section sized to receive a jacketed end *of* the hybrid cable 811. The rear housing [830] *838* can define a central opening 843 for routing the optical fibers 812 from the hybrid cable 811 to the interior of the connector body 821 for termination at the ferrules 833. The forward portions 839 of the half-pieces 838a, 838b can define openings such as slits 844 for receiving the rear tails 837 of the connector electrical contacts 834. In this way, the rear tails 837 can extend into the receptacle 842 of the rear housing 838 to facilitate making electrical contact with the connector electrical conductors 813 of the hybrid cable 811.

In certain examples, the hybrid connector 820 can include an outer sleeve 845 that fits over the exterior of the hybrid cable 811 and also fits over the exteriors of the rear housing 838 and the connector body 821. In certain examples, the outer sleeve 845 can provide a sealed interface between the outer jacket of the hybrid cable 811 and the exterior of the hybrid connector 820. In certain examples, the outer sleeve 845 extends forwardly generally to the retention surface 830 of the retention flange 829. In one example embodiment, the outer sleeve 845 can be a shape memory material such as a heat-shrink tube. In certain examples, adhesive can be provided within the outer sleeve 845 to facilitate sealing and retention. It will be appreciated that the outer sleeve 845 can function to assist in securing the rear housing 838 to the connector body 821. The outer sleeve 845 can also provide a retention function for assisting in axially securing the hybrid cable 811 to the hybrid connector 820.

Referring to FIG. 18, the connector body 821 has an elongate transverse cross-sectional shape that is elongated so as to be longer along a major axis M3 as compared to along a minor axis M4. In certain examples, connector body 821 defines a width W2 along the major axis M3 that is longer than a height H2 defined along the minor axis M4. As shown at FIG. 18, ferrules 833 are aligned along the major axis M3. Also, the side notches 831 are positioned on opposite sides of the major axis M3. The connector body 821 has major sides 846 positioned on opposite sides of the major axis M3 and minor sides 847 positioned on opposite sides of the minor axis M4. The side notches 831 are provided at the major sides 846. The minor sides 847 define rounded ends of the elongate transverse cross-sectional shape of the connector body 821.

Referring to FIG. 19, the hybrid adapter 836 is configured to mount within the port 814 of the structure 815. The hybrid adapter 836 includes an adapter housing 850 defined by an outer part 851 and an inner part 852. In the depicted example, the outer part 851 defines a port 853 sized for receiving the hybrid connector 820 and the inner part 852 defines one or more ports 854 (*see FIG. 21*) for receiving fiber optic connectors (e.g., LC connectors, duplex LC connectors, SC connectors, or other types of connectors). The outer part 851 includes flexible extensions 856 having tabs 857 for retaining the outer part 851 within the port 814 by a snap-fit connection. The inner part 852 mounts between the extensions 856 and includes recesses 858 that receive tabs 859 of the outer part 851 to secure the parts 851, 852 together. Adapter electrical contacts 860 mount at an outer end of the inner part 852. In certain examples, the adapter electrical contacts 860 mounted within the interior of the inner part 852. The adapter electrical contacts 860 can include C-shaped portions 862 for engaging the connector electrical contacts 834 and tabs 863 for allowing the adapter electrical contacts 860 to be electrically connected (e.g., wired) to an active component in need of power.

Referring to FIG. 20, the hybrid adapter 836 can include internal sleeves 864 positioned within the interior of the hybrid adapter 836. The sleeves 864 can be configured to receive the ferrules 833 of the hybrid connector 820. The sleeves 864 can also be configured to receive corresponding ferrules of the fiber optic connectors inserted within the ports 854 defined by the inner part 852. In this way, sleeves 864 can be configured to optically connect the optical fibers of the hybrid connector 820 to corresponding optical fibers of the fiber optic connectors mated with the ports 854 of the inner part 852. It will be appreciated that the ferrules 833 can fit inside the sleeves 864 and the front sleeves 825 of the connector body 821 may slide over the sleeves 864 of the hybrid adapter 836. The C-shaped portions 862 of the adapter electrical contacts 860 are positioned such that ends of the C-shaped portions 862 are positioned on opposite sides of the sleeves 864. In this way, when the hybrid connector 820 is inserted within the hybrid adapter 836, the C-shaped portions 862 flex apart and make gripping contact with the connector electrical contacts 834.

Referring still to FIG. 20, the hybrid adapter 836 defines a connector insertion axis 866 that extends through the hybrid adapter 836. When the hybrid connector 820 is inserted into the hybrid adapter 836, the longitudinal axis 824 of the hybrid connector 820 coaxially aligns with the connector insertion axis 866 of the hybrid adapter 836.

In certain examples, the width W2 of the transverse cross-sectional shape of the connector body 821 can be less than 2 centimeters and the height H2 of the transverse cross-sectional shape of the connector body 821 can be less than 1.5 centimeters.

Referring back to FIG. 19, the connection system 810 can include a robust active coupler for securely retaining the hybrid connector 820 within the hybrid adapter 836. In certain examples, robust active coupler is configured to retain the connector body 821 within the port 853 of the hybrid adapter 836 so as to withstand a pull-out force of at least 25 pounds. In other examples, robust active coupler is configured to retain the connector body 821 within the port 853 of the hybrid adapter 836 to withstand a pull-out force of at least 50 pounds.

Referring to FIG. 19, one example of a robust active coupler is shown as a slide clip 868. The slide clip 868 integrated as part of the hybrid adapter 836 and is not carried with the hybrid connector 820. This allows the hybrid connector 820 to maintain a relatively small transverse cross-sectional profile. The slide clip 868 is slidably mounted to an outer end of the outer part 851. For example, the slide clip 868 includes rails 869 that slide within corresponding channels 870 defined by the outer part 851 of the hybrid adapter 836. The slide clip 868 defines an opening 872 for receiving the hybrid connector 820 when the hybrid connector is inserted into the hybrid adapter 836. The opening 872 is elongated and has a matching transverse cross-sectional shape with the connector body 821. As shown at FIG. 20, the slide clip 868 includes a release tab 874 that is intersected by a reference plane 875 that includes the connector insertion axis 866 as well as a major axis of the opening 872. The slide clip 868 includes retention structures 876 positioned on opposite sides of the reference plane 875. The retention structures 876 are positioned at major sides of the opening 872. Each of the retention structures 876 includes a ramp 877 that faces at least partially in an outward direction. Each of the retention structures 876 also includes a retention surface 878 (*see FIG. 21*) that faces in an inward direction.

The slide clip 868 is movable relative to the adapter housing 850 between a coupling position and a non-coupling position. The slide clip 868 slides along the channels 870 of the hybrid adapter 836 when moving between the coupling position and the non-coupling position. It will be appreciated that the direction of movement of the slide clip 868 between the coupling position and the non-coupling position is generally transverse relative to the connector insertion axis 866. The slide clip 868 is configured to retain the connector body 821 within the port 853 of the hybrid adapter 836 when in the coupling position. The slide clip 868 is configured to allow the connector body 821 to be removed from the port 853 of the hybrid adapter 836 when in the non-coupling position.

In certain examples, the hybrid adapter 836 can be configured to bias the slide clip 868 toward the coupling position. For example, referring to FIG. 19, the hybrid adapter 836 includes a spring such as a leaf spring 880 that is configured to bias the slide clip 868 toward the coupling position. The leaf spring 880 mounts within an elongate pocket 881 defined within the release tab 874. The outer part 851 of the adapter housing 850 includes a spring reaction structure 882 that cooperates with the leaf spring 880 to bias the slide clip 868 toward the coupling position. Referring to FIG. 19, the slide clip 868 is loaded into the outer part 851 of the adapter housing 850 by inserting the clip 868 upwardly such that the rails 869 are received within the channels 870. The slide clip 868 is then slid upwardly until the release tab 874 is positioned above the outer part 851 of the adapter housing 850. It will be appreciated that the slide clip 868 includes a slot 883 for allowing the spring reaction structure 882 to pass through the slide clip 868 as the slide clip is moved upwardly. Once the release tab 874 is positioned higher than the spring reaction structure 882, the leaf spring 880 is slid into the elongate retention pocket 881. As so positioned, a free end of the leaf spring 880 is positioned directly over the spring reaction structure 882. In this way, contact between the spring reaction structure 882 and the spring 880 prevents the slide clip 868 from being removed downwardly from the adapter housing 850. The spring reaction structure 882 has an angled top surface 884 that opposes the underside of the leaf spring 880. A peak 885 of the angled top surface 884 contacts the leaf spring 880. The angled configuration of the angle top surface 884 provides clearance for allowing the leaf spring 880 to flex as the release tab 874 is manually depressed downwardly to move the slide clip 868 from the coupling position to the non-coupling position. Once the release tab 874 is released, the elasticity of the leaf spring 880 causes the slide clip 868 to return to the coupling position from the non-coupling position.

To provide secure retention of the hybrid connector 820 within the hybrid adapter 836, the retention structures 876 of the slide clip 868 are adapted to engage the connector body 821 on opposite sides of the connector body 821. For example, in the depicted embodiment, the retention structures 876 engage the connector body 821 on both of the major sides 846 of the connector body 821. Thus, the retention structures 876 engage the connector body 821 on opposite sides of the major axis [M1] *M3*.

Figure 22:
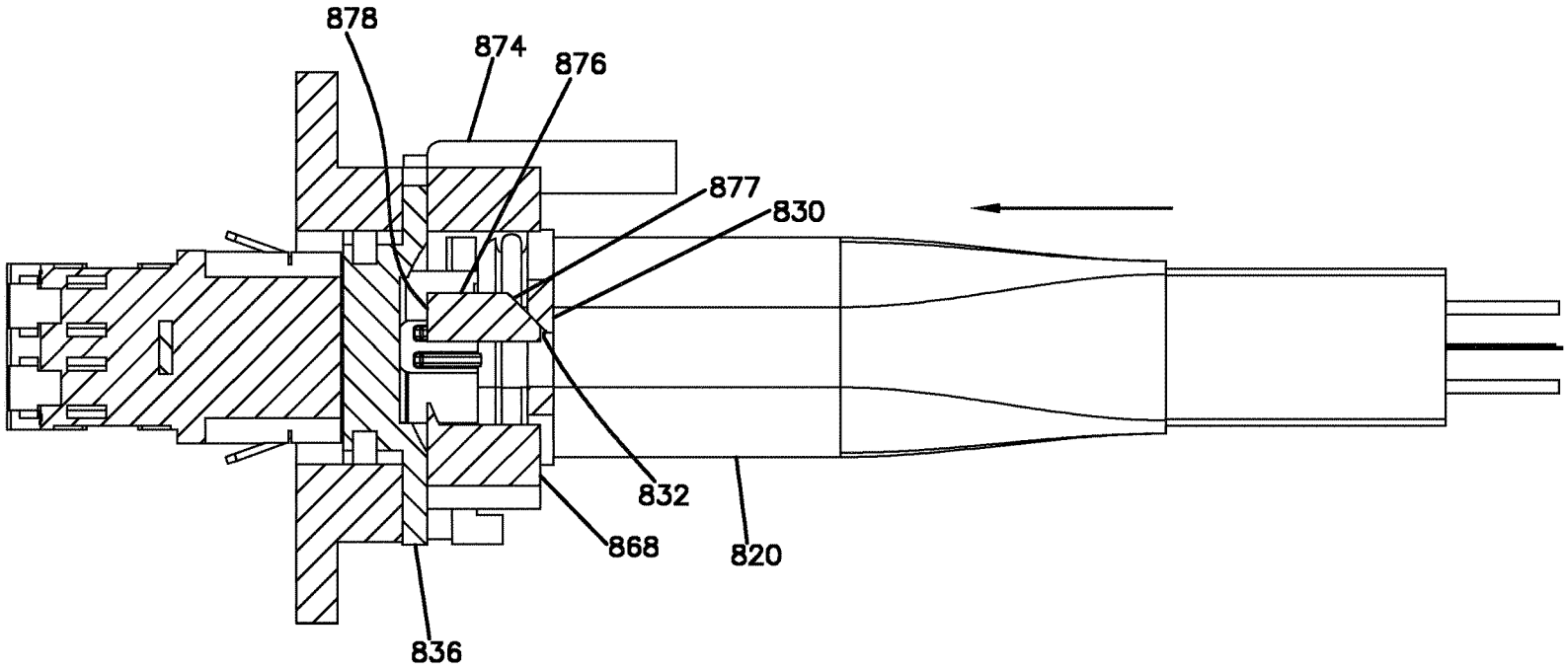
FIG. 22 is a cross-sectional view showing the hybrid connector inserted into the fiber optic adapter to a point where a ramp surface of the hybrid connector engaging a ramp surface of the slide clip, the slide clip is still in the coupling position.
Figure 23:
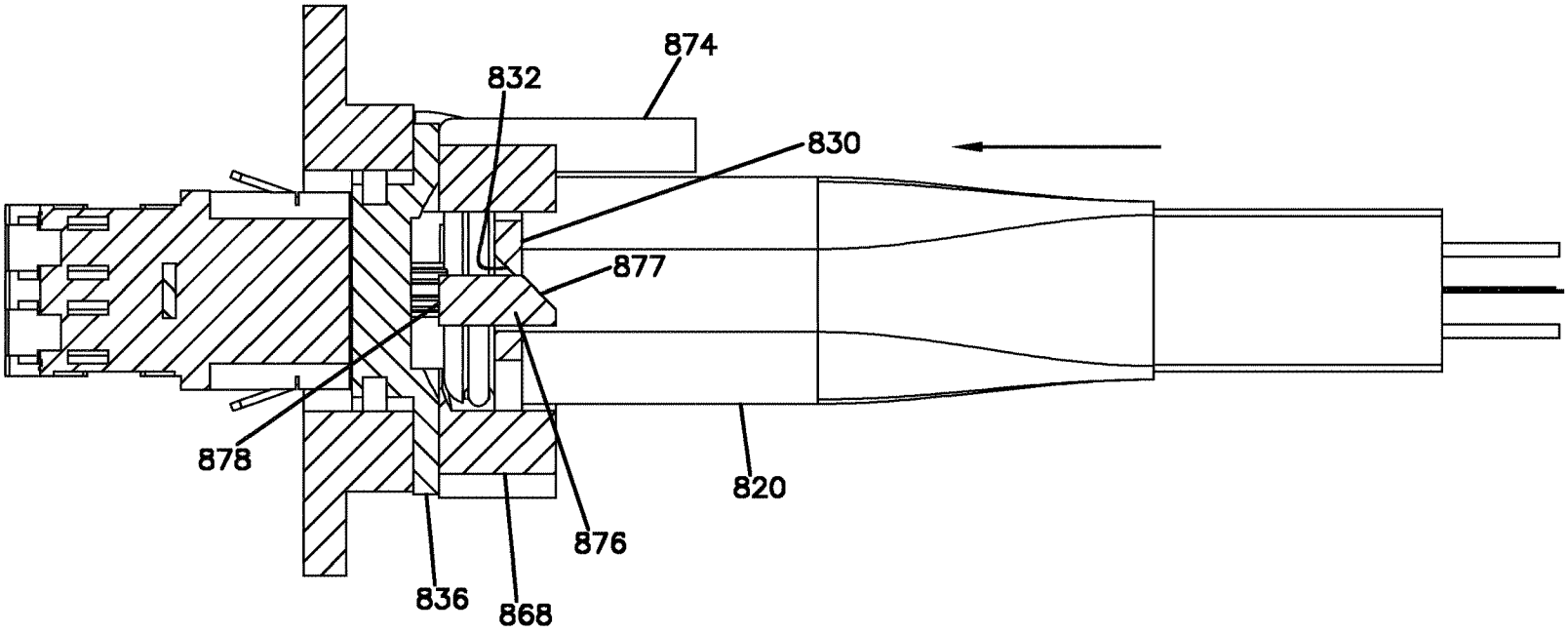
FIG. 23 is a cross-sectional view showing the hybrid connector inserted into the fiber optic adapter to a point where engagement of the ramp surfaces has caused the slide clip to move to a non-coupling position adapted for allowing the hybrid connector to pass through the slide clip.
Figure 24:
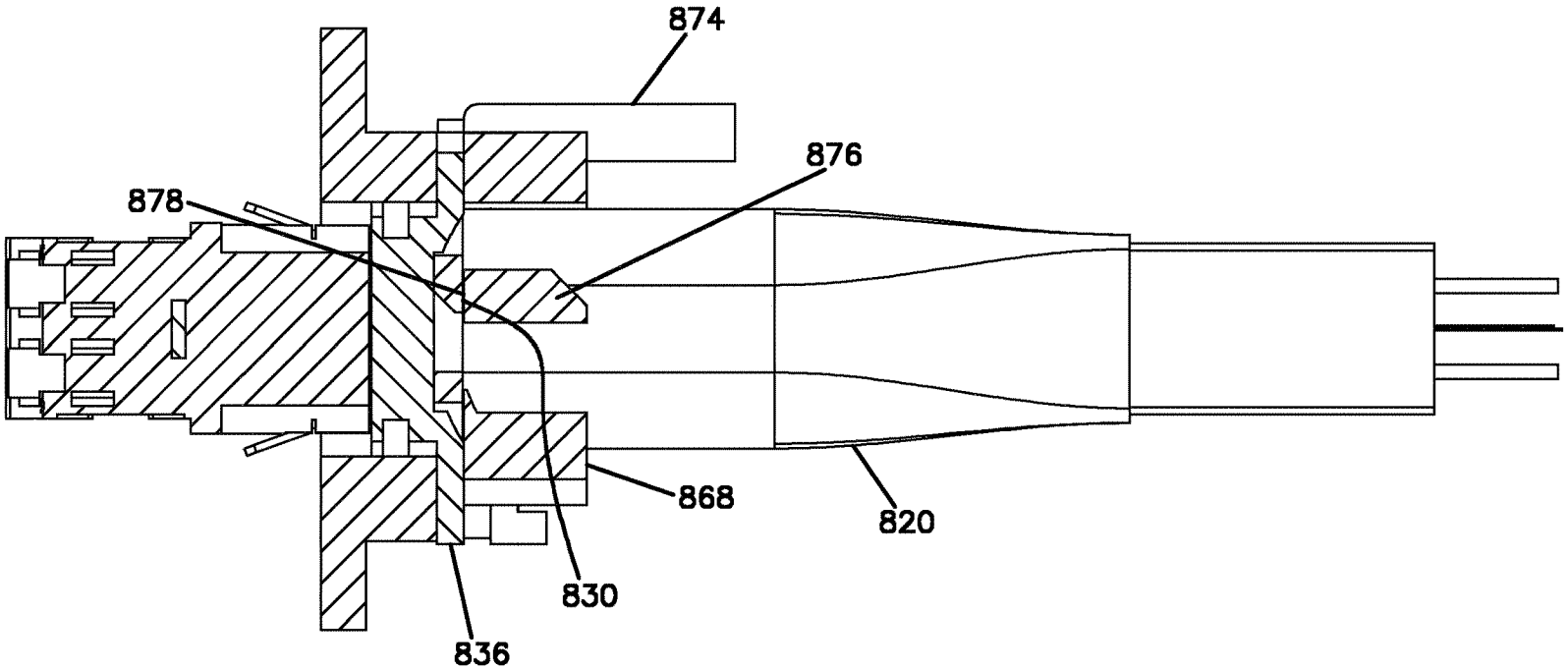
FIG. 24 is a cross-sectional view showing the hybrid connector fully inserted into the fiber optic adapter and the slide clip moved to a coupling position where the slide clip retains the hybrid connector within the hybrid adapter.

To mate the hybrid connector 820 with the hybrid adapter 836, the hybrid connector 820 is oriented such that the longitudinal axis 824 of the hybrid connector 820 coaxially aligns with the connector insertion axis 866 of the hybrid adapter 836 (see FIGS. 20 and 21). As so positioned, the side notches 831 provided at the major sides 846 of the connector body 821 align with the retention structures 876 provided at the major sides of the opening 872 of the slide clip 868. The hybrid connector 820 is then inserted axially along the connector insertion axis 866 into the hybrid adapter 836. As the hybrid connector 820 is inserted into the hybrid adapter 836, the ramps 832 at the side notches 831 of the hybrid connector 820 engage the ramps 877 of the retention structures 876 of the hybrid adapter 836 (see FIG. 22). Contact between the ramps 832, 877 as the hybrid connector 820 is continued to be inserted into the hybrid adapter 836 causes the slide clip 868 to move from the coupling position (see FIG. 22) to the non-coupling position (see FIG. 23). Inward insertion of the hybrid connector 820 continues until the retention surface 830 of the retention flange 829 of the hybrid connector 820 moves inwardly past the retention surfaces 878 at inner ends of the retention structures 876. When this occurs, the spring 880 biases the spring clip 868 back to the coupling position as shown at FIG. 24.

With the hybrid connector 820 fully inserted within the hybrid adapter 836 and the slide clip 868 in the coupling position, the retention surfaces 830 defined by the retention flange 829 at the major sides [848] *846* of the connector body 821 are opposed by the retention surfaces 878 of the retention structures 876 of the slide clip 868. In this way, interference between the retention surfaces 830, 878 prevent the hybrid connector 820 from being withdrawn from the hybrid adapter 836. With the hybrid connector 820 fully inserted within the hybrid adapter 836, the ferrules 833 are received within the sleeves 864 of the hybrid adapter 836, the front sleeves 825 of the hybrid connector 820 fit over the sleeves 864 of the hybrid adapter 836, and the adapter electrical contacts 860 engage the conductor electrical contacts 834.

Figure 25:
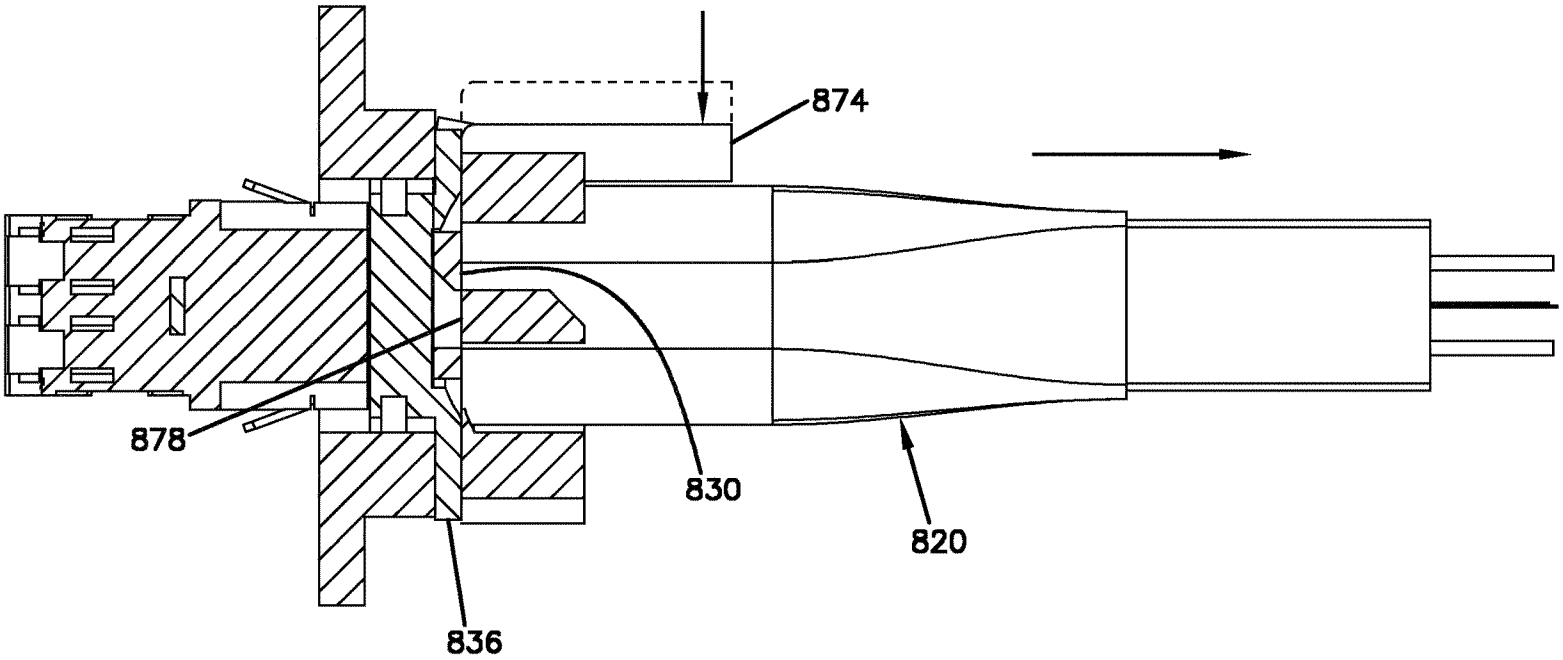
FIG. 25 is a cross-sectional view showing the hybrid connector fully inserted into the fiber optic adapter and the slide clip being manually depressed to the non-coupling position so as to allow the hybrid connector to be removed from the hybrid adapter.

To remove the hybrid connector 820 from the hybrid adapter 836, the release tab 874 is manually depressed as shown at FIG. 25 to move the slide clip 868 from the coupling position to the non-coupling position. Once the slide clip 868 has been depressed to the non-coupling position, the hybrid connector 820 can be axially withdrawn from the hybrid adapter 836.

Aspects of the present disclosure relate to hybrid connection systems that facilitate the fast, low cost and simple deployment of optical fiber and electrical power to interface with active devices. In certain examples, the hybrid connectivity system can provide power and optical signals to active devices in a local area network (LAN). In certain examples, the active devices can include optical network terminals (ONT) within a building. The ONTs can be located at or near desktop locations. The ONTs can include circuitry for providing optical-to-electrical and electrical-to-optical signal conversion. The ONTs can be coupled to active devices such as computing devices. In other examples, the active devices can include devices for generating wireless communication coverage areas (e.g., wireless transceivers) and other active devices (e.g., cameras, computing devices, monitors, etc.). In still other examples, systems in accordance with the principles of the present disclosure can provide power and fiber optics to a power-over-Ethernet extender. The power-over-Ethernet extender can include optical-to-electrical conversion circuitry for converting optical signals to electric signals that are transmitted through copper cabling such as twisted pair cabling. Electrical power provided to the power-over-Ethernet extender can be directed over the twisted pair cabling to provide power in a power-over-Ethernet format.

While aspects of the present disclosure have been shown used with hybrid connection systems, it will be appreciated that the various aspects are also applicable to non-hybrid fiber optic connection systems and non-hybrid electrical connection systems Various modifications and alterations of this disclosure may become apparent to those skilled in the art without departing from the scope and spirit of this disclosure, and it should be understood that the scope of this disclosure is not to be unduly limited to the illustrative examples set forth herein.

PARTS LIST

10 A system
11 Base location
12a-f Equipment
14 Structure
16 Central office
18 Multi-fiber optical trunk cable
20 Hybrid cable
22 Transceivers
24 Radio Tower
100 Outer jacket
102 Major axis
104 Minor axis
106 Left portion
108 Right portion
110 Central portion
112 Left passage
114 Right passage
116 Central passage
118 Central longitudinal axis
120 Left electrical conductor
122 Right electrical conductor
124 Optical fiber
126 Left pre-defined tear location
128 Right pre-defined tear location
130 Top side
132 Bottom side
134 Upper slit
136 Lower slit
138 Non-slitted portion
140 Jacket weakening members
142a-b Tensile strength structure
144 [Longitudinal edges/ends] *Gap*
620 [Fiber optical] *Hybrid* connector
624 Electrical contacts
626 Connector body
627 Major sides
628 Cylindrical sleeves
629 Minor sides
630 Intermediate structure
632 Key feature
634 First peripheral groove
636 Second peripheral groove
638 Adapter
640 Receptacle
642 Receptacle
644 Alignment sleeves
646 Locking element
648 Flange
650 Latch
652 Electrical contacts
654 Internal portions
656 External portions
658 First piece
660 Second piece
[719 Connector body]
[720 Connector]
[721 Adapter]
[722 Ferrules]
[723 Shutters]
[725 Electrical contacts]
[746 Slide clip]
[770 Ramp structures for moving shutters]
810 Connection system
811 Hybrid cable
812 Optical fibers
813 [Connector electrical contacts] *Electrical conductors*
814 Port
815 Structure forming enclosure
[820 Hybrid connector]
821 Connector body
822 Front end
823 Rear end
824 Longitudinal axis of connector
825 Front sleeves
826 Key structure
827 Peripheral groove
828 Seal
829 Retention flange
830 Retention surface
831 Side notches
832 Ramps
833 Ferrules
834 Adapter electrical contacts
835 Partial cylinder
836 Hybrid adapter
[820 Hybrid connector]
838 Rear housing
839 Forward portions
840 Tabs
841 Opening
842 Receptacle
843 Central opening
844 Slits
845 Outer sleeve
846 Major sides
847 Minor sides
850 Adapter housing
851 Outer part
852 Inner part
853 Outer port of adapter
854 Inner ports of adapter
856 Extensions
857 Tabs
858 Recess
859 Tabs
860 Adapter electrical contacts
862 C-shaped portions
863 Tabs
864 Sleeves
866 Connector insertion axis
868 Slide clip
869 Rails
870 Channels
872 Opening
874 Release tab
875 Reference plane
876 Retention structure
877 Ramp
878 Retention surface
880 Leaf spring

881 Elongate pocket
882 Spring reaction structure
883 Slot
884 Angled top surface
885 Peak

What is claimed is:

1. A hybrid fiber optic connector comprising:

a connector body having a transverse cross-sectional shape, the connector body [including] *has* two [generally cylindrical] sleeves at a front of the connector body[.]*;*

[the two generally cylindrical sleeves each including] a separate ferrule mounted [therein] *within each of the two sleeves of the connector body for supporting a respective optical fiber*; and electrical contacts that mount over the two [generally cylindrical] sleeves so as to be carried with the connector body;

wherein the electrical contacts are electrically conductive bands *positioned on an exterior of the connector body on the two sleeves with rear tails that extend rearwardly through the connector body and are adapted to be electrically connected to electrical conductors of a hybrid cable*.

2. The hybrid fiber optic connector of claim 1, wherein the transverse cross-sectional shape of the connector body is elongated and generally oval shaped.

3. The hybrid fiber optic connector of claim 1 *in combination with an adapter*, wherein the *hybrid fiber optic* connector mates with [an] *the* adapter for [optical] *optically* coupling *the* optical fibers supported by the *ferrules of the hybrid fiber optic* connector to [responding] *corresponding* optical fibers of other optical connectors.

4. The [hybrid fiber optic connector] *combination* of claim 3, wherein the connector body defines a first peripheral groove.

5. The [hybrid fiber optic connector] *combination* of claim 3, wherein the adapter includes electrical contacts configured to engage the electrical contacts carried with the connector body.

6. The [hybrid fiber optic connector] *combination* of claim 3, further comprising an intermediate structure positioned generally between the two [generally cylindrical] sleeves.

7. The [hybrid fiber optic connector] *combination* of claim 4, wherein the first peripheral groove receives a sealing member.

8. The [hybrid fiber optic connector] *combination* of claim 6, wherein the intermediate structure includes a key feature that ensures the hybrid fiber optic connector is inserted into the adapter at a suitable rotational orientation.

9. The [hybrid fiber optic connector] *combination* of claim 7, wherein the sealing member is an O-ring.

10. The [hybrid fiber optic connector] *combination* of claim 7[.] *in* further [comprising a] *combination with the* hybrid cable, wherein the *hybrid fiber optic* connector is mounted to an end of the hybrid cable.

[11. The hybrid fiber optic connector of claim 10, wherein the hybrid cable includes electrical conductors and the electrical contacts are adapted to be electrically connected to the electrical conductors of the hybrid cable.]

12. The [hybrid fiber optic connector] *combination* of claim 3, wherein the adapter defines a port for receiving the connector body.

13. The [hybrid fiber optic connector] *combination* of claim 12, wherein a robust active coupler is included with the adapter and not carried with the connector body, the robust active coupler being movable relative to the port of the adapter and being configured to retain the connector body within the port.

14. The [hybrid fiber optic connector] *combination* of claim 13, wherein the robust active coupler is configured to retain the connector body within the port so as to withstand a pull-out force of at least 25 pounds.

15. The [hybrid fiber optic connector] *combination* of claim 13, wherein the robust active coupler is configured to retain the connector body within the port so as to withstand a pull-out force of at least 50 pounds.

16. The [hybrid fiber optic connector] *combination* of claim 13, wherein the robust active coupler is slidably movable between a coupling position and *a* non-coupling position, the robust active coupler being configured to retain the connector body within the port when in the coupling position, the robust active coupler being configured to allow removal of the connector body from the port when in the non-coupling position.

17. The [hybrid fiber optic connector] *combination* of claim 13, wherein the robust active coupler is a slide clip.

18. The [hybrid fiber optic connector] *combination* of claim 16, wherein when the robust active coupler is in the coupling position the robust active coupler engages the connector body at retention locations positioned at opposite sides of the connector body.

* * * * *